(12) United States Patent
Cohen

(10) Patent No.: US 9,237,120 B2
(45) Date of Patent: *Jan. 12, 2016

(54) MESSAGE BROKER SYSTEM AND METHOD

(71) Applicant: Open Text S.A., Luxembourg (LU)

(72) Inventor: Stefan Daniel Sandberg Cohen, Töllsjö (SE)

(73) Assignee: Open Text S.A., Luxembourg (LU)

(*) Notice: Subject to any disclaimer, the term of this patent is extended or adjusted under 35 U.S.C. 154(b) by 0 days.

This patent is subject to a terminal disclaimer.

(21) Appl. No.: 14/526,261

(22) Filed: Oct. 28, 2014

(65) Prior Publication Data

US 2015/0046555 A1 Feb. 12, 2015

Related U.S. Application Data

(63) Continuation of application No. 13/454,492, filed on Apr. 24, 2012, now Pat. No. 8,914,809.

(51) Int. Cl.
| | | |
|---|---|---|
| *G06F 3/00* | (2006.01) | |
| *G06F 9/44* | (2006.01) | |
| *G06F 9/46* | (2006.01) | |
| *G06F 13/00* | (2006.01) | |
| *H04L 12/58* | (2006.01) | |
| *G06Q 10/06* | (2012.01) | |

(52) U.S. Cl.
CPC ............ *H04L 51/066* (2013.01); *G06F 9/44* (2013.01); *G06F 13/00* (2013.01); *G06Q 10/06* (2013.01)

(58) Field of Classification Search
None
See application file for complete search history.

(56) References Cited

U.S. PATENT DOCUMENTS

| | | |
|---|---|---|
| 5,299,304 A | 3/1994 | Williams et al. |
| 5,524,250 A | 6/1996 | Chesson |
| 5,713,014 A | 1/1998 | Durflinger et al. |
| 5,911,776 A | 6/1999 | Guck |
| 5,970,490 A | 10/1999 | Morgenstern |
| 5,995,996 A | 11/1999 | Venable |
| 6,012,098 A | 1/2000 | Bayeh et al. |
| 6,151,608 A | 11/2000 | Abrams |
| 6,172,988 B1 | 1/2001 | Tiernan et al. |
| 6,234,568 B1 | 5/2001 | Aoki |
| 6,236,997 B1 | 5/2001 | Bodamer et al. |
| 6,243,107 B1 | 6/2001 | Valtin et al. |

(Continued)

FOREIGN PATENT DOCUMENTS

WO WO 2006/041340 4/2006

OTHER PUBLICATIONS

Office Action for U.S. Appl. No. 10/184,430, mailed Sep. 21, 2005, 12 pgs.

(Continued)

*Primary Examiner* — Craig Dorais
(74) *Attorney, Agent, or Firm* — Sprinkle IP Law Group

(57) ABSTRACT

A message broker system can include a message broker. The message broker can be configured to receive the message instances output as input message instances, store the input message instances in a message store, alter the structure or content of the input message instances according to a message brokering model to generate output message instances and provide output message instances to one or more downstream processors. According to one embodiment, input message stream processing can be decoupled from output message stream processing by the message broker.

21 Claims, 11 Drawing Sheets

(56) References Cited

U.S. PATENT DOCUMENTS

| | | |
|---|---|---|
| 6,263,332 B1 | 7/2001 | Nasr et al. |
| 6,275,536 B1 | 8/2001 | Chen et al. |
| 6,336,124 B1 | 1/2002 | Alam et al. |
| 6,336,139 B1 | 1/2002 | Feridun et al. |
| 6,397,232 B1 | 5/2002 | Cheng-Hung et al. |
| 6,484,178 B1 | 11/2002 | Bence, Jr. et al. |
| 6,587,972 B1 | 7/2003 | Baird et al. |
| 6,623,529 B1 | 9/2003 | Lakritz |
| 6,668,254 B2 | 12/2003 | Matson et al. |
| 6,748,020 B1 | 6/2004 | Eifrig et al. |
| 6,782,379 B2 | 8/2004 | Lee |
| 6,810,429 B1 | 10/2004 | Walsh et al. |
| 6,816,871 B2 | 11/2004 | Lee |
| 6,877,156 B2 | 4/2005 | Osborne et al. |
| 7,043,687 B2 | 5/2006 | Knauss et al. |
| 7,054,952 B1 | 5/2006 | Schwerdtfeger et al. |
| 7,055,096 B2 | 5/2006 | Namioka |
| 7,127,520 B2 | 10/2006 | Ladd et al. |
| 7,143,087 B2 | 11/2006 | Fairweather |
| 7,213,249 B2 | 5/2007 | Loo et al. |
| 7,216,163 B2 | 5/2007 | Sinn |
| 7,225,256 B2 | 5/2007 | Villavicencio |
| 7,257,600 B2 | 8/2007 | Matson et al. |
| 7,284,235 B2 | 10/2007 | Nachmanson et al. |
| 7,302,678 B2 | 11/2007 | Bohlmann et al. |
| 7,308,399 B2 | 12/2007 | Fallen-Bailey et al. |
| 7,478,402 B2 | 1/2009 | Christensen et al. |
| 8,380,830 B2 | 2/2013 | Ladd et al. |
| 8,914,809 B1 | 12/2014 | Cohen |
| 9,047,146 B2 | 6/2015 | Ladd et al. |
| 2001/0047369 A1 | 11/2001 | Aizikowitz et al. |
| 2001/0056362 A1 | 12/2001 | Hanagan et al. |
| 2002/0083205 A1 | 6/2002 | Leon et al. |
| 2002/0165975 A1 | 11/2002 | Abbott |
| 2003/0023336 A1 | 1/2003 | Kreidler et al. |
| 2003/0065623 A1 | 4/2003 | Corniel et al. |
| 2003/0085902 A1 | 5/2003 | Vogelaar et al. |
| 2005/0160086 A1 | 7/2005 | Haraguchi et al. |
| 2006/0095511 A1 | 5/2006 | Munarriz et al. |
| 2006/0233108 A1 | 10/2006 | Krishnan |
| 2007/0204058 A1 | 8/2007 | Ladd et al. |
| 2009/0064175 A1 | 3/2009 | Taylor et al. |
| 2010/0023642 A1 | 1/2010 | Ladd et al. |
| 2013/0132974 A1 | 5/2013 | Ladd et al. |
| 2015/0178139 A1 | 6/2015 | Ladd et al. |

OTHER PUBLICATIONS

Office Action for U.S. Appl. No. 11/583,369, mailed Apr. 3, 2009, 8 pgs.
Office Action for U.S. Appl. No. 12/573,352, mailed Sep. 13, 2010, 9 pgs.
Office Action for U.S. Appl. No. 13/092,771, mailed Jul. 20, 2011, 12 pgs.
Office Action for U.S. Appl. No. 13/092,771, mailed Jan. 4, 2012, 13 pgs.
Office Action for U.S. Appl. No. 13/745,096, mailed Sep. 30, 2013, 10 pgs.
Office Action for U.S. Appl. No. 13/454,492, mailed Nov. 26, 2013, 18 pgs.
Office Action for U.S. Appl. No. 13/745,096, mailed Jan. 15, 2014, 15 pages.
Office Action for U.S. Appl. No. 13/745,096, mailed Jul. 25, 2014, 16 pgs.
Notice of Allowance for U.S. Appl. No. 13/454,492, mailed Aug. 6, 2014, 10 pgs.
Notice of Allowance for U.S. Appl. No. 13/745,096, mailed Dec. 1, 2014, 4 pgs.
Office Action for U.S. Appl. No. 14/638,700, mailed Mar. 26, 2015, 14 pgs.
Final Office Action issued for U.S. Appl. No. 14/638,700, mailed Oct. 6, 2015, 13 pages.

MESSAGE BROKER SYSTEM AND METHOD

CROSS-REFERENCE TO RELATED APPLICATION

This application is a continuation of, and claims a benefit of priority under 35 U.S.C. 120 of the filing date of U.S. patent application Ser. No. 13/454,492, filed on Apr. 24, 2012, entitled "Message Broker System and Method", the entire contents of which are hereby expressly incorporated by reference for all purposes.

TECHNICAL FIELD

The present disclosure relates to data transformation, and more particularly, to apparatuses and methods for transforming an input data stream in a first data format of a plurality of first data formats to an output data stream in a second data format of a plurality of second data formats.

BACKGROUND

Business communication has become increasingly complex. The demands of business trends such as Customer Relationship Management and Supply Chain Management combined with emerging communication technologies, which allow business partners to share information instantly, are mainly responsible for this communication evolution. The number of business partners and the means with which they collaborate (using e-mail, fax, public internet and mobile devices) are steadily increasing. Adding to this complexity, a growing number of customers and suppliers require that the communication be tailored to their specific needs. In short, businesses today need to provide communication processes that are automated and personalized. Meeting this challenge requires a new understanding of business communications in the age of the Internet. Thus, there is a need for better control of the complexity of business communication.

SUMMARY

Embodiments described herein provide systems and methods that allow for autonomous storage and alteration of messages generated when processing a data stream of a first format to transform it into a second format. One embodiment described herein can comprise a system of altering message instances that includes an input connector to receive an input data stream, an output connector to provide an output data stream, a processor and a set of computer instructions stored on a non-transitory storage medium. The set of computer instructions can be executable to provide an event agent, a message broker and a processing engine. The event agent can be configured to identify events in the input data stream and output message instances containing data corresponding to the events from the input data stream, where the message instances are structured according to a message model. The message broker may be operatively coupled to the event agent and can be configured to receive, as input message instances, the message instances output by the event agent, store the input message instances in a message store, alter the structure or content of the input message instances according to a message brokering model to generate output message instances and provide output message instances to one or more downstream processors. A processing engine may be configured to execute a process on the output message instances to generate an output.

Another embodiment can include a method for transforming an input data stream in a first data format to an output data stream of a second format, the method comprising: providing an message model corresponding to a defined event, providing a message brokering model, receiving input message instances structured according to the message model, wherein the input message instances contain data corresponding to events identified in an input data stream, storing the input message instances in a message store, altering the structure or content of the input message instances according to a message brokering model to generate output message instances, and generating the output data stream using the output message instances. Alteration of messages may include editing message contents, mapping a message structure to a different structure, concatenating messages, splitting messages or applying other transformations to the content and/or structure of the messages. According to one embodiment, such alterations can be applied serially.

Message alteration provides a number of advantages. As one advantage, message instances corresponding to one message type (e.g., created using a first event) can be transformed to message instances having a structure corresponding to a second message type (e.g., corresponding to a second event). Processes appropriate to the second message type can then be applied to data that was initially structured according to the first message type. Consequently, the same process can be reused for i) message instances according to the first structure and transformed to a second structure and ii) message instances initially created according to the second structure. In a system in which process models are closely tied to event models, this can allow the same process to be reused for message instances created from different types of events.

As another advantage provided by one embodiment, message instances created from different event models can be combined to create a new message instance. This means that processes can be applied to a message instances containing data collected based on different event models from potentially different types of input data, different input threads and different jobs.

As yet another advantage provided by one embodiment, external data can be added to message instances from any number of sources to create a message instance that includes the external data. Consequently, each process that applies to the message instance containing the external data does not have to independently collect the external data through scripts.

As yet another advantage, message instances can be stored in a message store. Consequently, data from message instances received at different periods of time can be used in a data stream, allowing input message stream processing to be decoupled from output message stream processing.

BRIEF DESCRIPTION OF THE DRAWINGS

The drawings accompanying and forming part of this specification are included to depict certain aspects of the invention. A clearer impression of the invention, and of the components and operation of systems provided with the invention, will become more readily apparent by referring to the exemplary, and therefore nonlimiting, embodiments illustrated in the drawings, wherein identical reference numerals designate the same components. Note that the features illustrated in the drawings are not necessarily drawn to scale.

DETAILED DESCRIPTION

The disclosure and various features and advantageous details thereof are explained more fully with reference to the exemplary, and therefore non-limiting, embodiments illustrated in the accompanying drawings and detailed in the following description. It should be understood, however, that the detailed description and the specific examples, while indicating the preferred embodiments, are given by way of illustration only and not by way of limitation. Descriptions of known programming techniques, computer software, hardware, operating platforms and protocols may be omitted so as not to unnecessarily obscure the disclosure in detail. Various substitutions, modifications, additions and/or rearrangements within the spirit and/or scope of the underlying inventive concept will become apparent to those skilled in the art from this disclosure.

As discussed above, businesses today need to provide communication processes that are automated and personalized. For example, many corporations, governmental organization, educational institutions and the like must periodically distribute individualized information, such as invoices, bills, transcripts, etc. to a large number of people. Often this information is maintained using proprietary systems not accessible by the recipients and it is therefore necessary to convert the information to form that can be sent to the recipients. Accordingly, a message distribution system can be provided that receives input data and transforms the input data to an output data format so that the information can be printed, e-mailed, faxed, etc.

Figure 1:
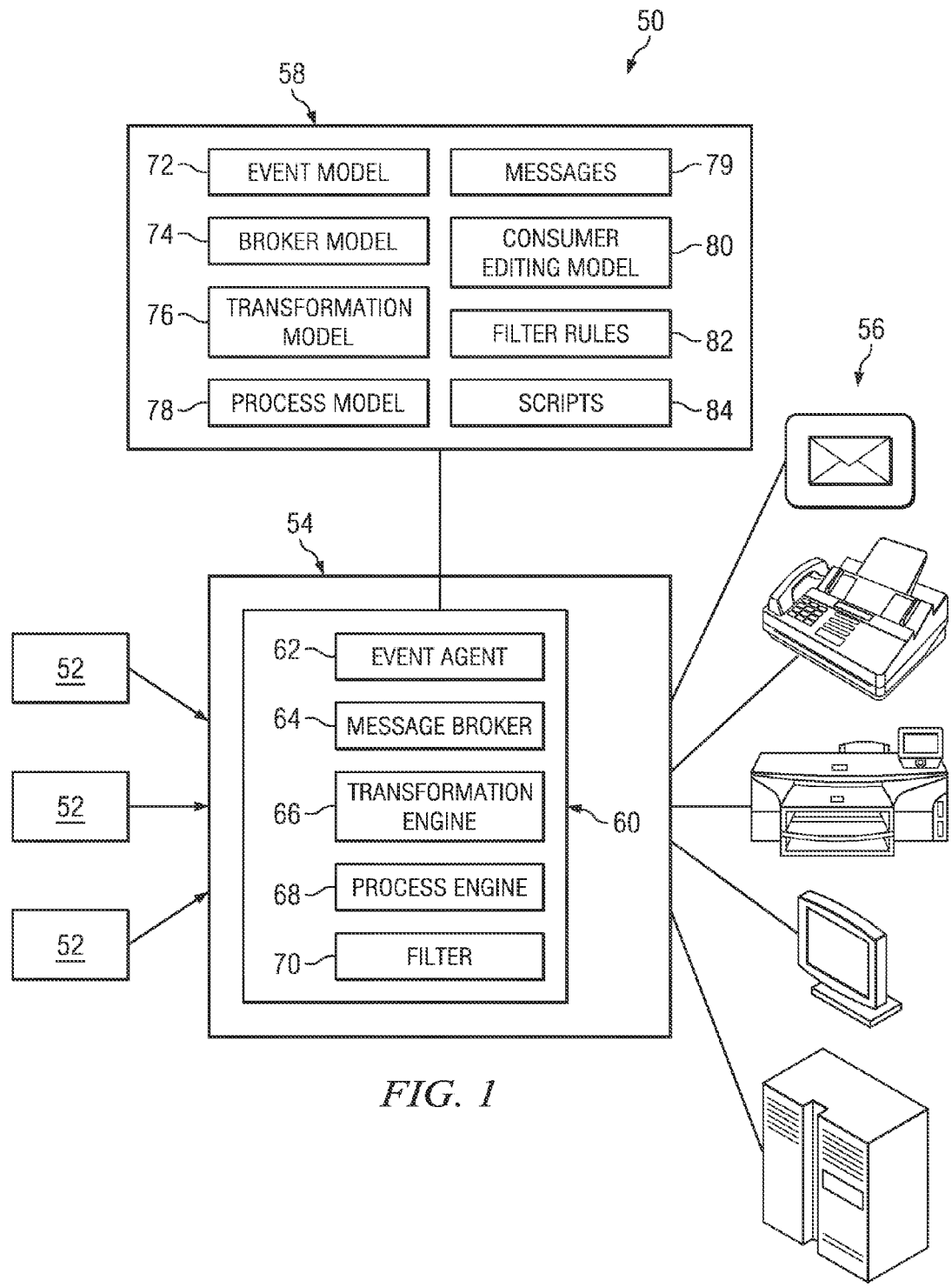
FIG. 1 is a general block diagram of one embodiment of a system for transforming an input data stream in a first data format of a plurality of first data formats to an output data stream in a second data format off a plurality of second data formats.

FIG. 1 is a diagrammatic representation of one embodiment of a message distribution topology 50 including multiple data sources 52, a message distribution system 54 and multiple message distribution channels 56. Data sources 52 may store a large amount of information for distribution to individual users (or groups of users). However, data sources may store information in a manner that is not accessible or readily usable by recipients. For example, data sources 52 may comprise systems running enterprise software that manages business operations, such as SAP CRM, SAP ERB, SAP ISU Billing (all from SAP, AG headquartered in Walldorf, Baden-Wurttemberg). Accordingly, data sources 52 may be coupled (e.g., by one or more networks (WAN, LAN, the Internet or other network) or other communications channels (e.g., direct dial in)) to a message distribution system 54, which transforms input data streams from input data formats to output data formats.

Message distribution system 54 collects or otherwise receives data from data sources 52, parses the data for particular information and distributes corresponding messages via one or more distribution channels 56 including, for example, e-mail, web, paper or other distribution channel. To provide a contextual example, message distribution system 54 can be configured to receive a stream of billing data from a utility, parse the data into information for individual utility customers and create individualized bills for each customer in high-volume runs. The individualized bills may then be provided to printers (e.g., for sending to customers via regular mail), facsimile, e-mail, through a web site or through other means.

Message distribution system 54 may include one or more computers communicatively coupled to a network and a data store 58. Message distribution system 54 may include a message distribution application 60 that comprises an event agent 62, a message broker 64, a transformation engine 66, a process engine 68 and filters 70. While shown as a single application on a system, event agent 62, message broker 64, transformation engine 66, process engine 68, filter 70 can be implemented as different applications, objects or according to other suitable computer programming architectures, may be distributed among multiple computers and may be implemented through any combination of hardware and/or instructions.

Distribution application 60 may use models, rules and other configuration information to configure the runtime environment for processing a data stream. Therefore, data store 58 can include a set of configuration information that affects the processing of message distribution system 54. In one embodiment, the configuration information may include an event model 72, a message brokering model 74, a transformation model 76, a processing model 78, consumer model 80, filtering rules 82 for filtering information, scripts 84 or other configuration information.

Event model 72 defines sequences or patterns of data to detect in input data and a mapping of data for events to corresponding message models. According to one embodiment, the message model provides a message structure that is a generic structure for a type of message and includes a set of fields and blocks, each block and field having an identifier. The message structure can be a tree structure with blocks as container for fields and other blocks. For a message instance created from a message model, fields contain values collected from the input data stream.

Message brokering model 74 defines rules for augmenting, restructuring, combining or otherwise changing message instances of one or more message types. Consumer editing model 80 specifies rules for adding external data to message instances. Message brokering model 74 and consumer editing model 80 thus define how to alter the content and structure of the messages. Transformation model 76 includes rules for manipulating the input data stream. Process model 78 defines rules for formatting message instances for output. Filter rules 82 specify rules for filtering information received in an input data stream. Scripts 84 define specified customized processes that occur during processing of messages.

Message distribution system 54 can receive streams of input data in a variety formats, including packetized data, files, EDI and XML documents. Filters 70 can filter out certain information from the input data stream based on filter rules 82. Event agent 62 can parse the input data and create message instances based on event model 72. According to one embodiment, event agent 62 scans the input data and, if it finds a matching pattern, extracts the appropriate data and builds message instances using the extracted data and event model 72. The messages created can be tracked through references to the messages in a list of messages. When a set of input data is fully scanned through, the list of message instances can be sorted and/or logged.

A message instance can be considered an abstraction of a portion of the input data set. According to one embodiment, a message instance includes blocks and fields in a tree structure with blocks as container for fields and other blocks as specified by the appropriate message model. The blocks provide structure to the message while the fields contain values collected from the input data set. Each field may also be assigned one or more data types. According to one embodiment, two kinds of data types can be defined, one high level data type that describes what the data is/what it is intended for and one low level data type that defines the valid contents of the data. High level data types are such things as "invoice_number" and "item_text" while low level data types are for example "number", "integer", "floating point" and "string" etc. The low-level data types could be used (in some cases, together with the existing input/output format properties on fields) to validate incoming (and outgoing) data for errors. If, for example, an "integer" data type is set on a field and the field contains the value "this is not a number" this would be an invalid field.

The following provides an example message structure for an event named "INTEREST_ITEMS_INV_REP":

```
B=root
    User
    Logical Printer
    PrintJobId
    Result Key
    Copies
B=Invoice Item
    LEDGER_ITEM_SERIES_ID
    LEDGER_ITEM_ID
    CURRENCY
    INVOICE_AMOUNT
```

In this example, the message structure includes a root node block that contains information regarding the print job requested. The remaining blocks (in this case the invoice item block) handle repetitive groups of fields.

The following provides one example of a message instance according to the above message structure, where each block corresponds to a row in a database and the fields are populated with values from the columns in those rows:

```
E=INTEREST_ITEMS_INV_REP
    B=root
        User                    IFSFV
        Logical Printer         LP51
        Printiobld              484
        Result Key              678
        Copies 1
        B=Invoice Item _1
            LEDGER_ITEM_SERIES_ID       CI
            LEDGER_ITEM_ID              MS002
            INVOICE_NO                  CIMS002
            CURRENCY                    SEK
            INVOICE_AMOUNT              9500
        B=Invoice Item_2
            LEDGER_ITEM_SERIES_ID       CI
            LEDGER_ITEM_ID              MS003
            INVOICE_NO                  CIMS003
```

-continued

```
            CURRENCY                    SEK
            INVOICE_AMOUNT              12795
```

The message instance depicted corresponds to a print job data stream that contains invoice information and is created according to the event model INTEREST_ITEMS_INV_REP. The message instance contains a root block in which all the information for the message instance is contained. As can be seen in this example, the root block can contain fields and child blocks ("Invoice_Item 1"), which can themselves contain fields and child blocks. The field values contain data from the input data stream. In some cases, the event model may specify that various fields should contain variables or tokenized data.

Process engine 68 executes processes on the message instances according to process model 78. A process is the creation of an output object based on process model 78 and the content and structure of the message. Example process types include a Paginated Output process, a Textual Output process, a Markup Language Output process, an Electronic Mail Output process, a Short Message Service Output process. According to one embodiment, a Paginated Output process produces a page layout for documents for printing, faxing, PDF, web etc.; a Textual Output process produces flat field and record based text files; a Markup Language Output process produces XML or other markup language output; an Electronic Mail Output Process produces e-mail and can also attach the result of another process to the e-mail; a Short Message Service Output process produces SMS messages that can be sent to mobile phones. Other process types can also be defined as needed or desired. Processes can map blocks and fields to templates according to the appropriate process model. As an example, the field value "9500" for the field "INVOICE_AMOUNT" can be mapped to a line in an XML document through an XML Output process model.

Event and process models may be closely tied such that there is, for example, a specific Paginated Output process defined for an "INTEREST_ITEMS_INV_REP" event with the process model mapping fields from the message structure for the "INTEREST_ITEMS_INV_REP" event an output object. This can create several shortcomings. In many cases, the event model and process model are defined when a system is first implemented. In such a case, it may be difficult to alter the event model as such an alteration would require modifying potentially numerous process models. Additionally, when the process model is tightly bound to a particular event model, the process model may only account for the structure of one type of message, making it difficult to reuse the same process model for multiple types of event models.

As another difficulty, the event model may be defined in a manner that is closely tied to a particular type of input data set (e.g., a stream of invoice data having a particular format) such that the message instances created from the event model only contain data from a particular input data set. This makes it difficult add external data or data from other message instances to an output object. One way to get around this shortcoming is to include scripts as part of processing a message instance to collect external data into variables and then using the variables for output instead of a message instance field. In order for such scripts to be reused in multiple process models, the script may have to be reentered for each of the process models. If multiple processes are being performed at once on the same message instances, this may mean that complex scripting is running in several processes, negatively affecting performance.

Furthermore, an event model may be defined in a manner that leads to inefficient downstream processing. For example, an event agent may, based on an event model, detect and collect data from a matrix of characters from an input data stream, where a single page of multi-page document is considered to be an event (and lead to a corresponding message) even if the proceeding or following pages form a logical document that should be considered together. This has the effect that the processes for that event are executed once for each page rather than on the document as a whole. In such a case where processes work on individual message instances, it would be difficult to use data coming from the last page when producing output based on the message coming from the first page.

As another short coming, in some current distribution systems, processing of input data streams is tied to creating and output data stream as a synchronous process. Intermediate data structures are not stored for use by multiple data streams or by an output processing decoupled from the input processing. Therefore, it is difficult to combine data from multiple data streams or data received at different times.

Because of such shortcomings that may occur, it is desirable to provide a mechanism by which messages can be restructured, combined or otherwise transformed to allow for more flexible application of processing. Accordingly, message broker 64 is provided. Message broker 64 receives input message instances generated by the event agent 62 and takes various actions on the input message instances output message instances previously generated by message broker 64 to generate new output message instances. Message broker 64 can alter messages, interact with external repositories to augment messages, store messages in a message store and take other actions. Process engine 68 can then apply the appropriate processes to the output message instance types.

Examples of message alterations include, but are not limited to, message concatenation, message editing and message mapping. Message concatenation may include merging the content of two or more message instances from the same input data stream or different input data streams, merging content from external sources with content from message instances or otherwise merging content from various sources. Message editing can include modifying the content (e.g., field values) of a message instance, modifying the structure (e.g., field and block names and the relative order) of a message instance, validating the content and structure of input and output message instances and setting default values and structural elements for an output message instance. Message mapping can include splitting an input message instance into two or more message instances, creating one or more output message instances from one input message instance, mapping the content from one input message instance to one or more output message instances. Message broker 64 can apply various alterations in series (e.g., such that message instances are concatenated, the concatenated message instance edited and so on).

Message alteration provides a number of advantages. As one advantage, message instances corresponding to one message type (e.g., created using a first event model) can be transformed to message instances having a structure corresponding to a second message type (e.g., corresponding to a second event model). Process engine 68 can apply a process model appropriate to the second event model. Thus, process engine 68 can use the same process model for i) message instances according to the first event model and transformed to a structure corresponding to the second model and ii) message instances created directly from the second event model. In other words, process engine 68 can reuse the same process model to process data collected on different event models.

As another advantage provided by one embodiment, message instances created from different event models can be combined to create a new message instance. Process engine 68 can then apply process models to the new message instance. This means that the process model is applied to a message instance containing data collected based on different event models from potentially different types of input data, even if the initial event models were tied to a particular type of input data.

As yet another advantage provided by one embodiment, message broker 64 can add external data to message instances from any number of sources to create a message instance that includes the external data. Consequently, each process that applies to the message instance containing the external data does not have to independently collect the external data through scripts. However, as discussed below, scripts may still be applied as needed or desired.

As yet another advantage, message broker 64 can store instances of messages in a message store for later processing by message broker 64 or a downstream process. Consequently, message broker 64 can process message instances received at different periods of time, allowing for message instance creation using asynchronous data. Furthermore, message broker allows the ingest processing to be decoupled from the message delivery processing.

Figure 2:
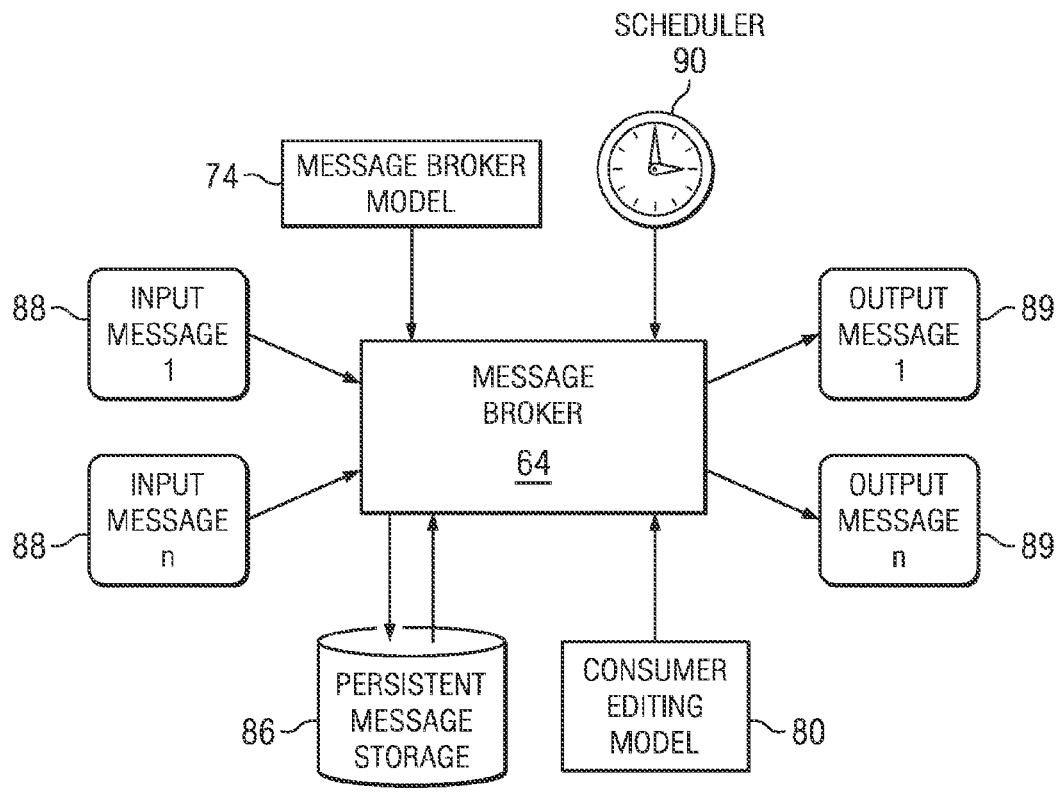
FIG. 2 is a more detailed block diagram of one embodiment of a message brokering system.

To provide further context, FIG. 2 is a diagrammatic representation of one embodiment of an architecture for message brokering. Message broker 64 can maintain message store 86 which stores message instances. Message store 86 can include persistent message storage or volatile (in memory) message storage or a combination thereof depending on data security/integrity and performance needs. Message broker 64 alters messages based on message brokering model 74 and consumer editing model 80, as discussed above, to generate output message instances 89. Scheduler 90 can schedule tasks for message broker (e.g., based on time, data collected or other factors).

In operation, message broker 64 can be notified that input message instances 88 are available for processing and can read the message instances. Message broker 64 validates the structure and content of the message instances to ensure that the messages have the appropriate content and structure to allow alteration according to message brokering model 74. For example, message broker 64 can determine if the message instance has the correct blocks and fields for the event type referenced in the message instance. Furthermore, message broker 64 can determine whether the data in a field is valid based on the data type then take a specified action (or no action, depending on a user setting) as a response to detecting invalid data. Similarly, message broker 64 can further validate the structure and content of output message instances 89 before storing output message instances 89 in storage 86 and/or passing the output message instances 89 for further processing.

If a message instance 88/89 is to be stored for later use (e.g., as specified in message brokering model 74), message broker 64 can store the message instances in message store 86. This may occur in addition to passing message instances to downstream processes. To prevent message store 86 from becoming too large, message instances can be expunged on a FIFO basis or at the occurrence of certain triggers (e.g., when the message instance has been in the repository for longer than a time limit, the message instance has been used by message broker in the creation of an output message instance or at the occurrence of other event).

Message broker 64 can take various actions on the input message instances 88 or previously created output message instances 89, including merging data from message instances to create new output message instances 89, mapping message instances 88 to output message instances 89 or taking other actions to generate output message instances 89. Actions can occur based on data content, temporal or other triggers. A data content trigger specifies that a message alteration should occur based on one or more pieces of content in the message instances. For example, a data content trigger may specify that all message instances (e.g., in a job, in storage 86, or both) having a "customer" field value of "customer 1" should be merged into a single output message instance 89. A temporal trigger may specify that message alteration should occur at specific time. For example, all message instances in message store 86 should be merged at 3:00 o'clock. A combination of triggers may also be used. For example, all message instances having a "customer" field value of "customer 1" should be merged at 3:00 o'clock. When a temporal trigger exists, scheduler 90 can notify message broker 64 to perform the specified tasks.

According to one embodiment, message broker 64 may include default behavior for input messages. As an example default behavior, message broker 64 may build output message instances based on the order in which input message instances are received or read from storage, with data from the first arriving input message instance being added to an output message instance first (e.g., through concatenation or generating a new message output instance). Message brokering model 74 may alter the runtime behavior of message broker 64 from the default behavior. For example, the message brokering model may define input message priorities that specify behavior for particular types of input message instances. According to one embodiment, the message brokering model may specify that i) if an input message instance of type 1 is received, the message broker should send previous output message instances out and start new output message instance for the received input message instance; ii) if an input message instance of type 2 is received, the message broker should add data from the received input message instance to a current output message instance; iii) if an input message instance of type 3 is received, the message broker should create and send out a new output message instance for the received input message as quickly as possible (e.g., without necessarily sending out current output message instances first). As another example, output message instances may be sorted for forwarding based on priorities assigned to the corresponding input message instances such that output message instances may be provided to downstream processes out of order. Thus, the behavior of message broker 64 can be configured through message brokering model 74.

Figure 3:
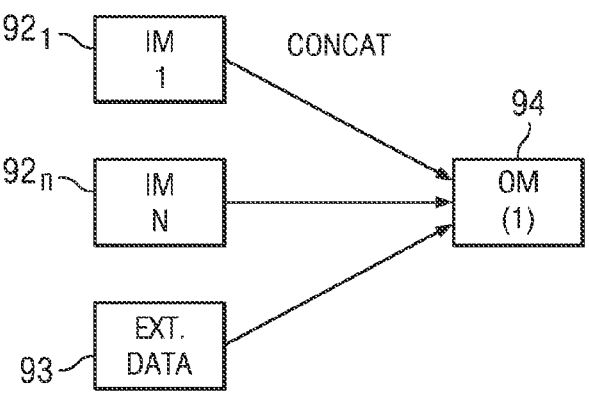
FIG. 3 is a diagrammatic representation of one embodiment of message concatenation.

As noted above, message broker 64 can perform various operations on message instances based on the message brokering model 74. FIG. 3 is a block diagram illustrating one embodiment of a concatenation operation. A user can specify fields and blocks from several input message instances $92_1$-$92_n$ and external data 93 to combine into a single output message instance 94. Concatenation can include concatenating input message instances $92_1$-$92_n$ from the same data stream (or input job) or multiple data streams. Concatenation allows the user to concatenate data from various events. For example, data can be merged from mixed input data streams of different types (XML input, PDF input) and used in one or more processes with several output formats. According to one embodiment, the structure of input message instances $92_1$-$92_n$ is preserved in output message instance 94. Thus, field and block names are preserved as well as their order. A runtime definition of what input messages, in what order and when they should be concatenated is provided in a runtime configuration by the message brokering model. Concatenation may occur based on various triggers including, for example, data content triggers and temporal triggers.

The message broker can concatenate message data with "non-message data" or other external data. One example of such an operation would be to complement data from a current job with extra information from an external database or an external application. The consumer editing model can define for the message broker what data to access and how to access it.

Figure 4:
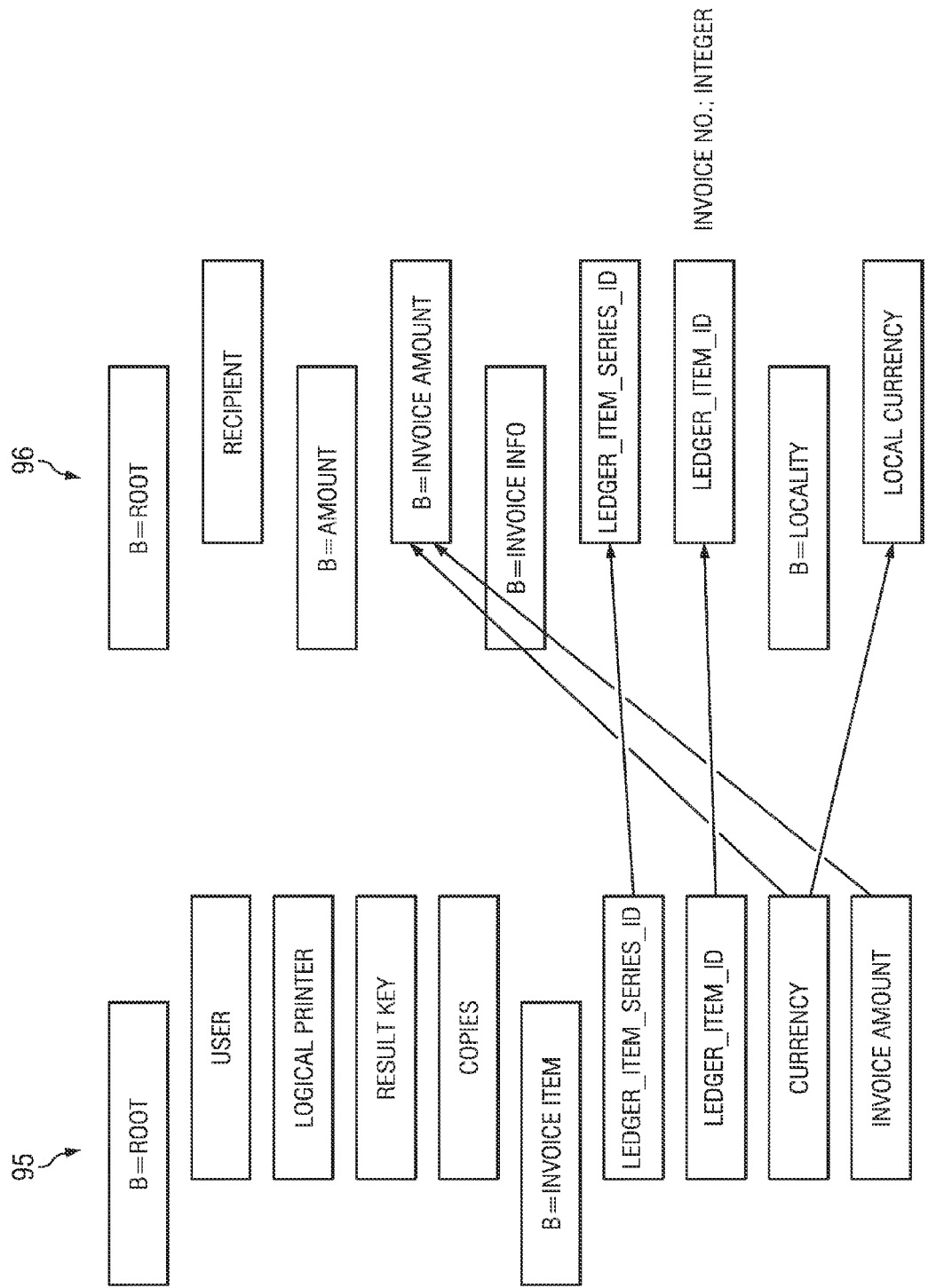
FIG. 4 is a diagrammatic representation of one embodiment of message mapping.

FIG. 4 is a diagrammatic representation of one embodiment of a mapping operation. Mapping includes modifying the message structure (fields, block names, order, etc.). Mapping may also be used to split message instances into two or more output message instances or reuse the content from a single input message instance in multiple output message instances. Additionally, mapping may be used to combine portions of input messages without fully concatenating the input messages.

During mapping, a first message structure 95 is mapped to one or more additional message structures (e.g., second message structure 96) such that input message instances of the first structure are used to generate output message instances according to the one or more additional structures. Restructuring of a message can include one-to-one, one-to-many, many-to-one, many-to-many mappings. In a one-to-one mapping, a message field of first message structure 95 is mapped to either the same field (direct mapping) or to a single field with a different name of second message structure 96. For example, the field "LEDGER_ITEM_SERIES ID" in first message structure 95 is mapped to field "LEDGER_ITEM_SERIES ID" of second message structure 96. In a one-to-many mapping, a field of message structure 95 is used repeatedly in the output message structure. For example, the field "CURRENCY" in message structure 96 is mapped to the fields "INVOICE AMOUNT" and "LOCAL CURRENCY" in message structure 95. In a many-to-one mapping, more than one field in the input message structure is mapped to one field in the output message structure. For example, the fields "INVOICE AMOUNT" and "CURRENCY" are mapped to the field "INVOICE AMOUNT" in message structure 96. In a many-to-many mapping, a set of fields in message structure 95 are mapped to multiple fields of message structure 96. In some cases, mapping includes dropping fields.

Mapping can add flexibility to a distribution system. For example, a user may wish to define a new process using particular block structures and field names without having to define new events. With mapping, the user can map message structures corresponding to existing events to a desired message structure for use with the new process. In another case, the user may wish to apply an existing process tied to a first event to message instances corresponding to a second event. With mapping, the user can map message instances created based on the first event to the message structure corresponding to the second event.

Mapping can further include mapping typed fields or un-typed fields to typed fields, allowing fields from input message instances to be typed according to the message brokering model. Thus, for example, un-typed field "LEGER_ITEM_ID" is mapped to a field having the types "invoice number" and "integer." The use of field typing can make the application of searching, concatenation rules and other operation easier. For example, a concatenation rule can be established that specifies concatenating all message instances have a field with the field type "invoice number" and having the value 123, regardless of whether the fields have the same name. Similarly, processes can be reused for messages having different field names but the same field types.

According to one embodiment, mappings can be stored as file accessible by the message broker (e.g., as an XML file or other file). The file can contain synonyms and mapping rules. The message broker can automatically match inputs against outputs based on field names or types.

Figure 5:
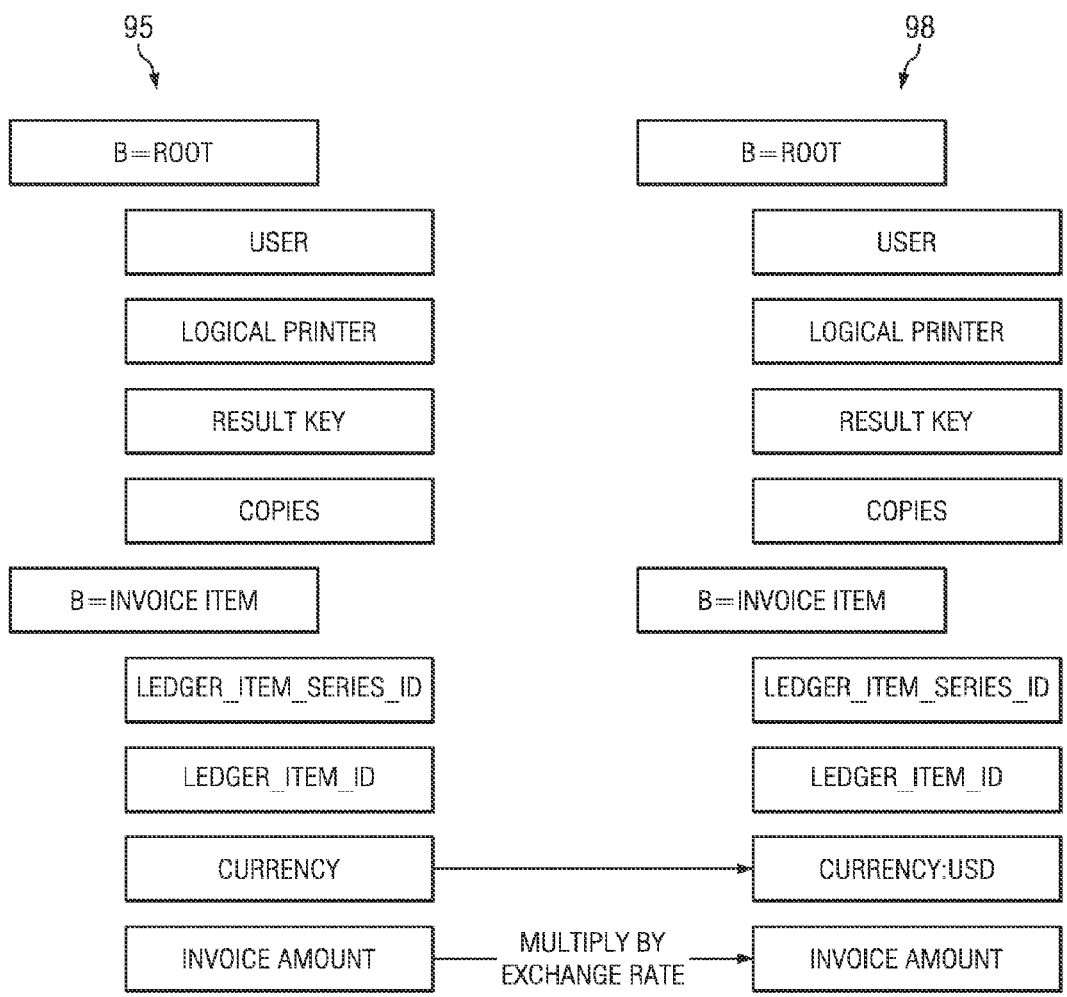
FIG. 5 is a diagrammatic representation of one embodiment of message editing.

FIG. 5 is a diagrammatic representation of one embodiment of a message editing operation. In general, message editing can change the content of a message rather than the structure, though message editing may also include modifying the field and block names and relative order of those objects. In the example of FIG. 5, the input message structure 95 and output message structure 98 are the same, but rules are applied so that when an input message instance according to structure 95 is received the value of the CURRENCY field is changed to USD (e.g., from SEK) and the value of the INVOICE_AMOUNT field is multiplied by the exchange rate. Message editing can be used, for example, to normalize values in output messages, enter default values in output messages, set default structural elements. Editing can include replacing content of a field with predefined content, appending content to a field, applying calculations to values in fields, apply logic to fields (e.g., AND, OR, NOT, XOR etc.), applying scripts to change the content of a field or taking other actions. The message editing rules may be arbitrarily complex.

Figure 6:
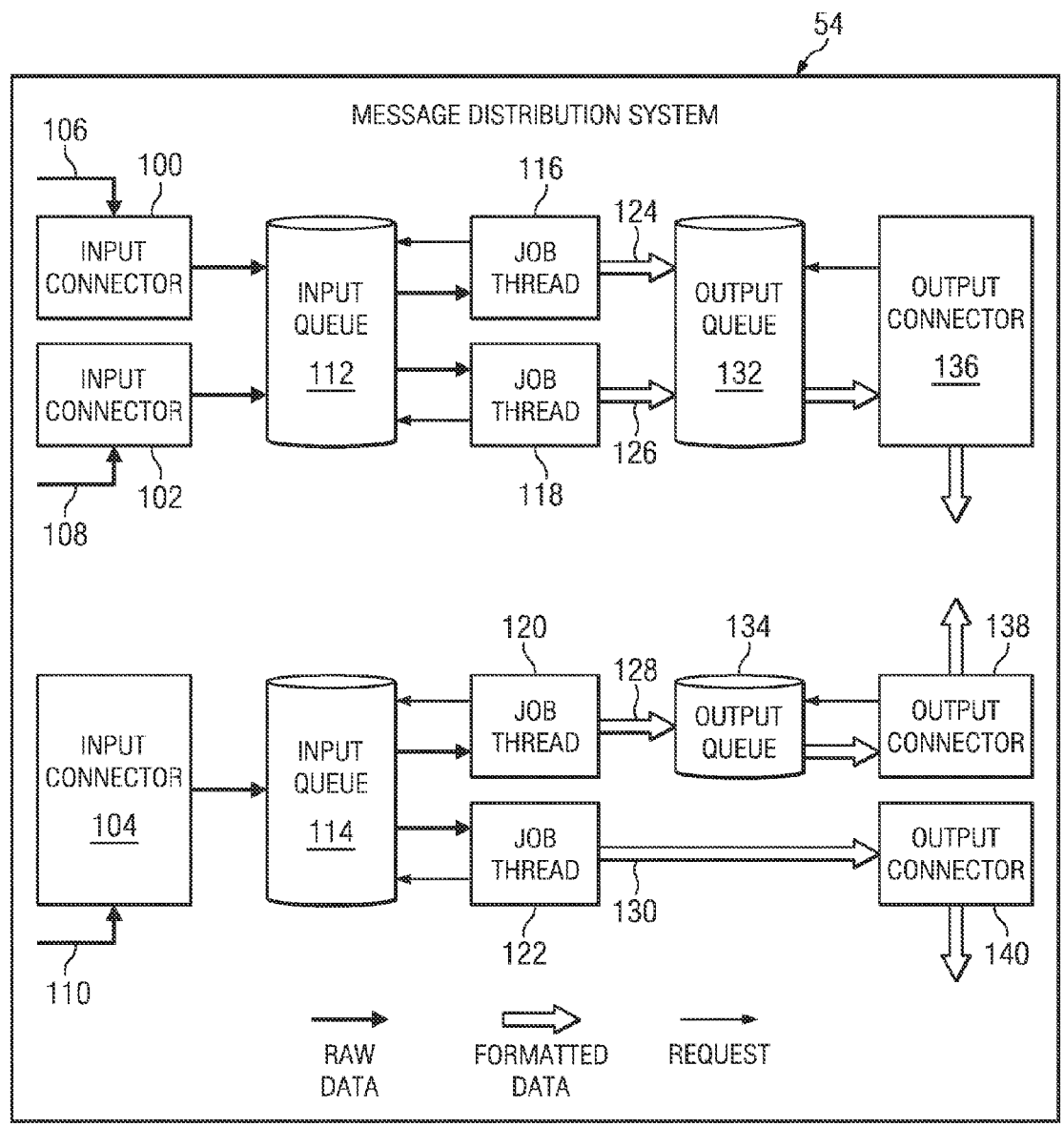
FIG. 6 is a diagrammatic representation of one embodiment of a system for transforming data streams.

A message broker may be implemented in the context of a system that receives input data streams and transforms the input data stream into an output data stream of a different format. FIG. 6 illustrates one embodiment of transforming an input data stream in a first data format of a plurality of first data formats to an output data stream in a second data format of a plurality of second data formats in one embodiment of a message distribution system 54. A plurality of input connector modules 100, 102, 104 receive respective input data streams 106, 108, 110. A plurality of input queues 112, 114 store the received input data streams 106, 108, 110. A plurality of job threads 116, 118, 120, 122 are operatively connected to respective input queues 112, 114. Each job thread (116, 118, 120, 122), preferably in parallel with at least one other job thread (116, 118, 120, 122), processes a stored input data stream to produce an output data stream (124, 126, 128, 130). A plurality of output queues 132, 134 respectively store the output data streams 124, 126, 128, 130 from the plurality of job threads 116, 118, 120, 122. A plurality of output connector modules 136, 138, 140 are operatively connected to the output queues 132, 134, the output connector modules 136, 138, 140 supplying respective output data streams (124, 126, 129, 130). It is to be understood that the system may have any number of input connector modules 100, 102, 104, input queues 112, 114, job threads 116, 118, 120, 122, output queues 132, 134, and output connector modules 136, 138, 140. Also, there is no restriction on how they may be shared and FIG. 6 is only one example of a system configuration.

Multi-threading increases the performance and provides support for parallel job execution. This system architecture also offers better scalability for multi-processor systems. All threads may be connected to queues and/or connectors, enabling extremely flexible configuration. Several job threads can serve one or several queues and several input connectors can use one or several queues and job threads.

In one embodiment job threads pick up data from the queue in the same order as it was stored. Jobs that arrive via input connectors are stored in input queues, and job threads pick up the jobs and execute them independently of other job threads. When an input connector has written a job to a queue, that connector is immediately ready to receive more data; it does not have to wait for the system to process previous jobs. After processing, jobs are stored in output queues, from where output connectors can pick them up and pass them on to their final destination.

Figure 7:
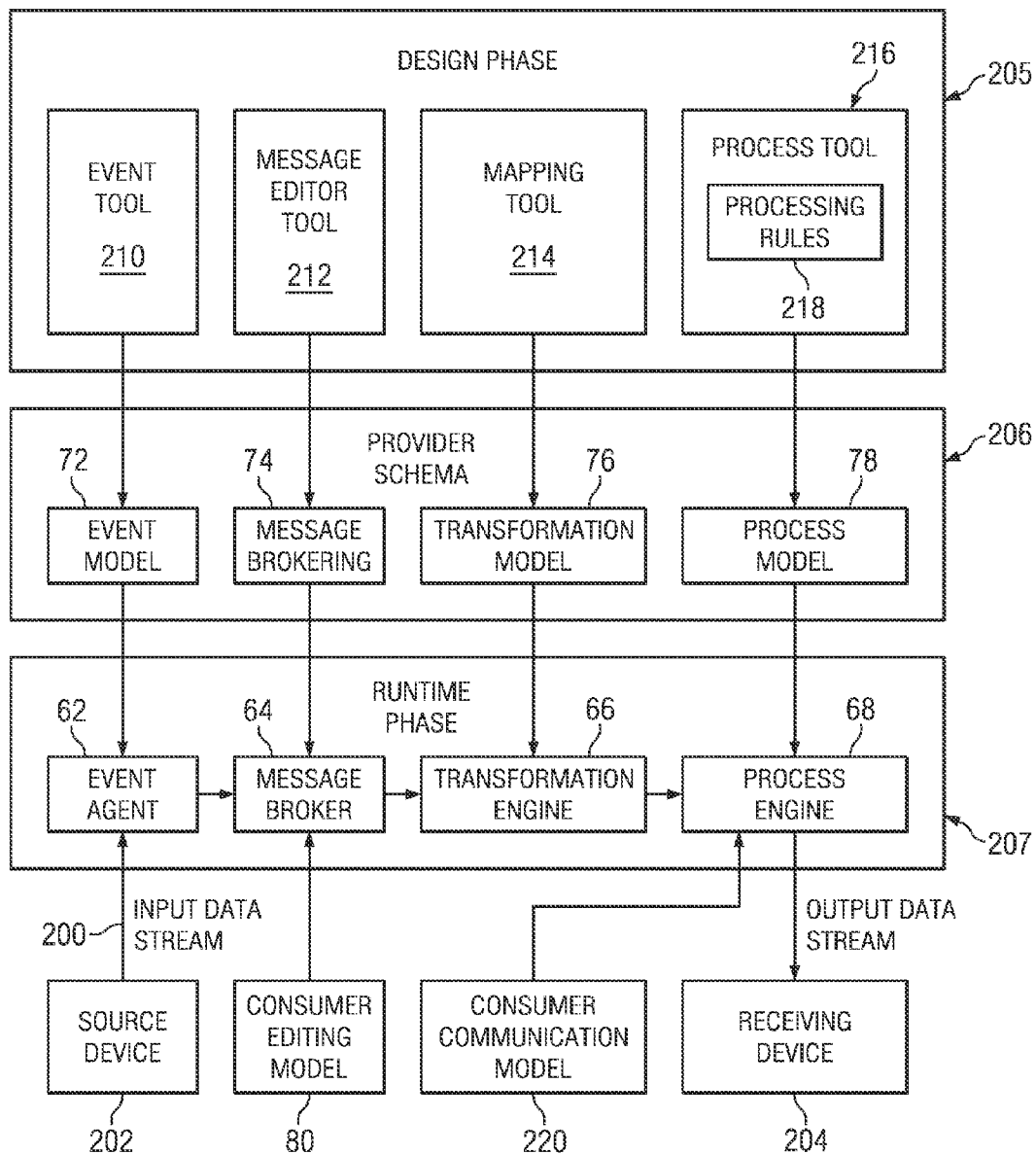
FIG. 7 is a diagrammatic representation of one embodiment of configuring a message distribution system.

FIG. 7 depicts a block diagram of one embodiment of configuring a distribution system and processing an input data stream. An input data stream 200 from a source device 202 or application (provider) is evaluated and manipulated based on the data content, transmission protocol and data format requirements of the receiving device 204 or application (consumer). Input can originate from a number of sources and be refined and then multiplexed to multiple output channels. Thus, one-to-many and many-to-many processing from provider to consumer is possible.

During a design phase 205, a user (human or programmatic) can be provided with tools to define a schema 206 that controls the processing that occurs in runtime phase 207. According to one embodiment, a user can be provided with an event tool 210, a message editor tool 212, a mapping tool 214 and a process tool 214. The event tool 210 provides an interface to define the event model, which includes sequences and patterns to detect in an input data stream and an output message structure. Message editor tool 212 can provide an interface used to create message brokering model 74 that controls the distribution system's ability to modify the structure and/or content of message instances. Mapping tool 214 provides an interface to create transformation model 76 which can control additional manipulations of data within a stream, for example mapping data from message instances into templates. Process tool 214 provides an interface for defining the processing rules 218 of processing model 78 for the presentation and delivery to the output data stream. The various tools in design phase 205 can be provided as a single application, as multiple applications, web interfaces or according to any suitable software architecture.

According to one embodiment, event model 72, message brokering model 74, transformation model 76 and process model 78 are statically defined as part of schema 206 and determine the global framework for communication processes between the source 202 and receiving device 204. External communication rules for the processing and delivery of the information personalized for the consumer may also be defined in a consumer communication model 220 at run time. The consumer communication model 220 may be dynamic and need not be predefined before the information is transformed or processed at runtime. The consumer communication model 220 is applied to the processing engine 68 to determine the actual communication rules 218. Additionally, message broker 64 may use a consumer editing model 80 to determine transformations to occur based on external data.

At runtime 206, event agent 62 identifies events in the input data stream. Message instances are created by event agent 62 for the events based on event model 72. Message instances can be altered and/or stored by message broker 64 according to message brokering model 74. Data in an input job may be further manipulated by transformation engine according to transformation model 76. The data in the input job can be further manipulated by process engine 68 based on the communication rules 216 in the process model 218 and the content and structure of the message instances.

Figure 8:
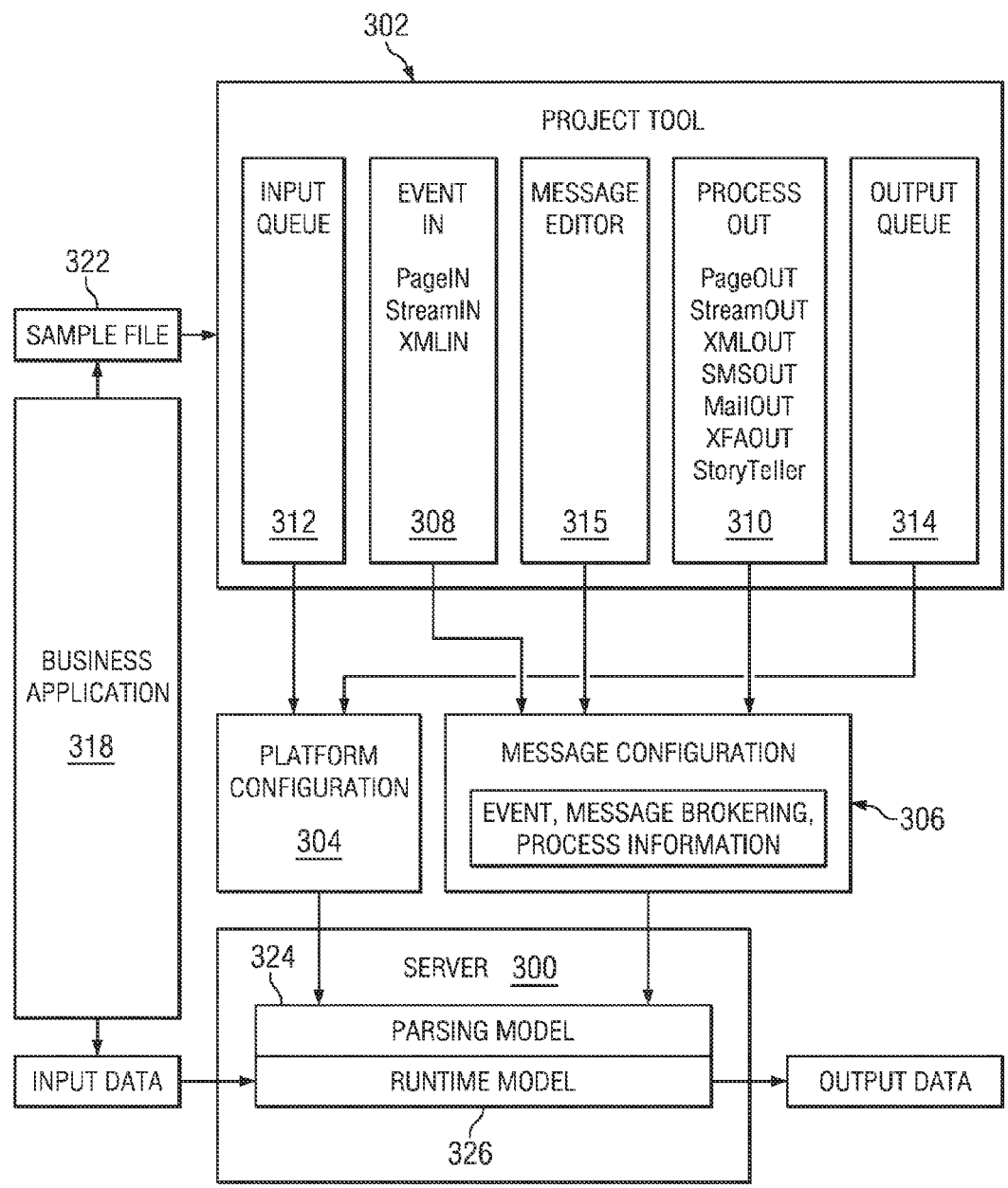
FIG. 8 is a diagrammatic representation of another embodiment of configuring a message distribution system.

FIG. 8 is a diagrammatic representation of one embodiment of configuring a message distribution system. According to on embodiment, a server 300 is configured using a project tool 302. Project tool 302 can be used to specify the events to be identified (represented at 308), processes to be performed on message instances (represented at 310), message brokering operations (represented at 315), and configuration information for input queues (represented at 312) and output queues (represented at 314). During an initiation phase the project tool 302 can use a sample file 322 from the business application 318 as a basis for specifying events, message alterations and processes.

Configurations are defined in the project tool 302 and then exported as platform configuration 304 and message configuration 306 to the server 300 (e.g., as one or more files or otherwise exported). Platform configuration 304 and message configuration 306 can be used by server 300 to establish a parsing model 324 and a runtime model 326. Embodiments of these models may be better understood with reference to FIG. 9. In general, though, server 300 reads the platform configuration 304 and message configuration 306 at startup and creates queues and connects the appropriate event agents, processes and queues according to the instructions in the configuration information 304, 306.

Figure 9:
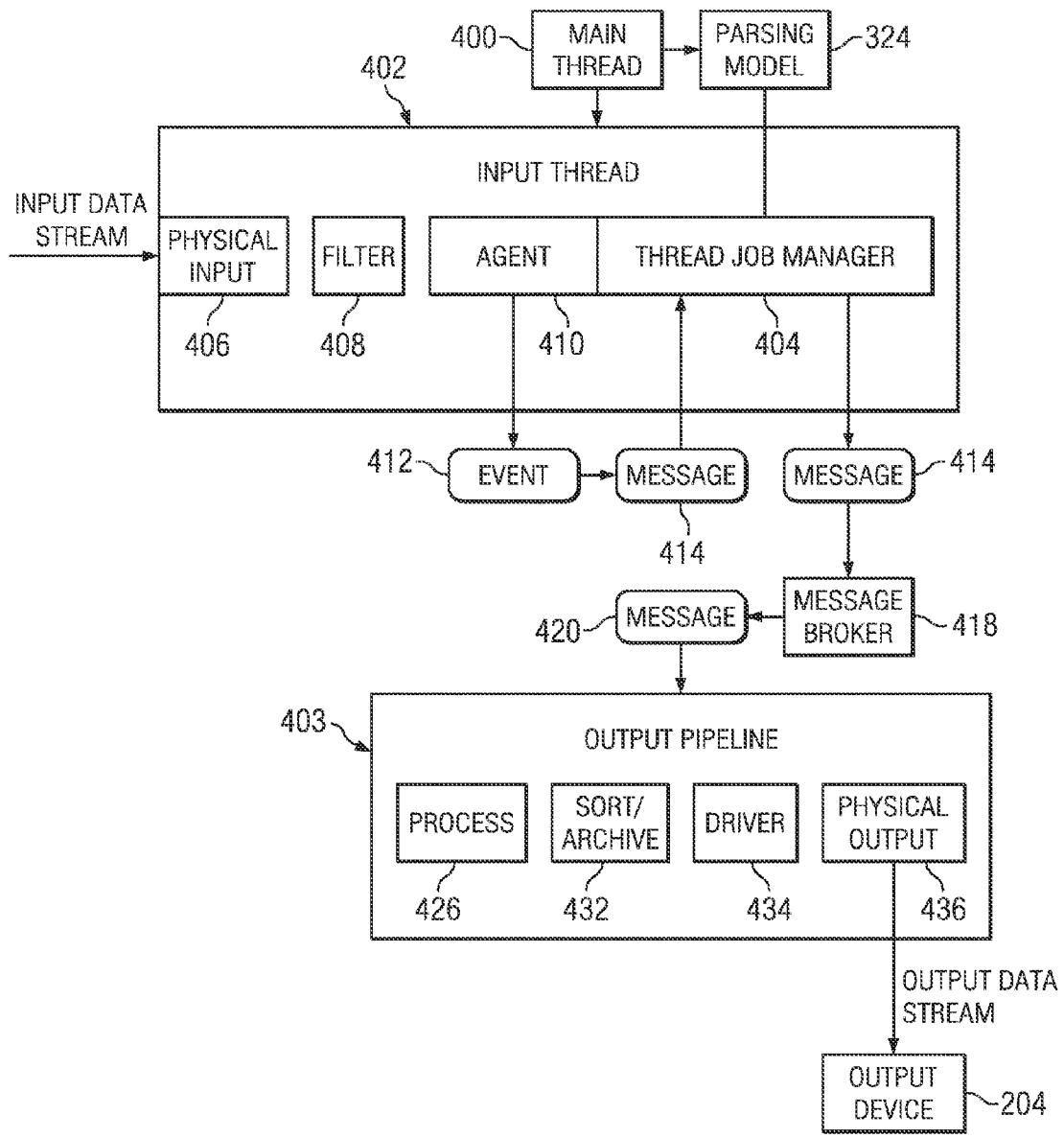
FIG. 9 a diagrammatic representation of one embodiment of an architecture in a distribution system for processing an input stream to create an output stream.

FIG. 9 a diagrammatic representation of one embodiment of an architecture in a distribution system for processing an input stream to create an output stream where processing includes a main thread 400, and an input thread 402 and an output pipeline 403. While the distribution system may be multi-threading, with multiple input threads acting on a data stream, only a single main thread 400 and input thread 402 are illustrated for simplicity. The main thread 400 is responsible for initiation. It can parse all command line options, all driver files, platform configuration information and message configuration information and/or other configuration information from the project tool. Based on this information it creates parsing model 324 and the runtime model.

Parsing model 324 can contain the event, message editing and process information specified by the user in project tool 302. Parsing model 324 can provide information for objects in the runtime environment such as agent information, which is information about which event agents will be used; variable information, which is information about which variables to create and instantiate; message structure, which is information about how to structure message instances; output action specifying which actions a process should take (e.g., sending output to an output pipeline, running a script or carrying out sorting, for example); sorting information, which is information about whether sorting should be done or not; output pipeline objects information, which is information regarding how output pipelines are created and the objects in the output pipelines; events and processes information, which is information regarding which events to detect in the data stream and which processes to launch when an event is detected; brokering information, which is information regarding which message alterations and storage rules should be applied. Parsing model 324, according to one embodiment, is created as a read-only object by the main thread 400 at startup and cannot be changed.

The runtime model contains information for components that are created at start-up and dynamic components that are created during runtime (such as filters, sorting objects, drivers, physical input/output objects or other components). According to one embodiment, certain components cannot be changed during the session. Other components, events, messages and output pipeline objects, may be dynamically created at runtime.

Main thread 400 also creates one input thread 402 for each input queue, starts these threads and then becomes passive. Main thread 400 remains passive until it gets a signal that a user wants to terminate the server. When this occurs, main thread 400 stops all input threads, de-allocates all resources and exits.

Input thread 402 can include a number of objects connected through one or more data and one or more message channels as a string processing pipeline. In general, flow through the input thread is managed by thread job manager 404. When executing the job, the thread job manager 404 creates events and processes and makes sure that they are executed in the right order. When processes are executed, the thread job manager 404 is also responsible for setting up the output pipeline for the process.

According to one embodiment, input thread 402 includes a physical input object 406. The physical input object 406 corresponds to a physical port through which incoming data is received. It is also the start of the input thread data. Examples of physical input ports include, but are not limited to: serial (receives data directly from a serial port); directory scan (scans a file system directory for files that match a file search criterion); device (listens directly to a hardware device, e.g., a parallel port); standard input (listens to standard input); TCP/IP sockets (listens to a socket for incoming data); named pipe; (listens: to a named pipe); internal (data is sent from a server output queue in the same system); netware bindery (acts as a NetWare printer); netware NDS (acts as a NetWare NDS printer). The physical input object 406 starts to listen for incoming data. How ports are listened to depend on the type of port. As soon as the physical input object 406 detects an incoming job, the physical input object 406 can send the job down the input thread data pipeline (e.g., byte by byte as raw data).

If a filter has been chosen for the input queue in the project tool, an input filter object 408 is inserted in the input thread data pipeline 402 after the physical input object 406. If several filters have been chosen, several filter objects are inserted in serial in the input pipeline. A filter's task is to remove unwanted sequences or to convert sequences in the incoming data stream. An example of removing sequences is a filter that removes PCL escape codes and just sends the actual PCL document data to the next object in the pipeline. An example of converting is a filter that receives compressed (zipped) data and uncompresses (unzips) it before sending it to the next object.

An agent 410 is the interface between the thread job manager 404 and the input thread data pipeline and receives the incoming data. Agent 410 is responsible for detecting events and extracting fields in the raw data input stream. The agent can further create message instances 414 from the extracted fields according to the message model for the corresponding event. There may be several different agents 410, each specialized for a specific type of input. For example, one agent for record based input from mainframes, another agent for XML data. The agent to use is specified in the project tool. The thread job manager 404 finds this information in parsing model 324.

Message instances 414 can be passed to message broker 418. Message broker 418 can store message instances in message store and create new messages. Thread job manager 404 can determine which alterations to apply based on parsing model 324. Output message instances 420 (or unaltered message instances 414) can be placed in an output pipeline 403. In some cases, all or part of the data in output message instance 420 may come from previously stored message instances (e.g., from previously processed data streams), thereby injecting asynchronous data into the processing of the input data stream.

The thread job manager 404 further identifies the processes 426 for the process engine to apply based on the events identified. Again, thread job manager 404 can find this information in parsing model 324. Furthermore, thread job manager 404 can set the appropriate output pipeline 403 for the process 426 based on parsing model 324. Output pipeline 403 can include various objects, such as a sort/archive object 428, driver object 434 and physical output object 436 configured as a string processing pipeline. The output object 436 may be operatively coupled to a receiving device 204, such as a fax machine, printer, e-mail server, database server or other receiving device. Output objects may be inserted anywhere in the pipeline 403. These objects may change the data that is sent. In another example, an output pipeline 403 may simply include a device driver object and a physical output object.

In general, the main task for a process 426 is to produce output and send it to output pipeline 403. The data may be received by the process engine as a message instance 414 or 420 containing blocks that contain fields. In this embodiment the execution is block driven, meaning that the process identifies all blocks in the message and then communicates with parsing model 324 to get instructions about which actions to take for each block, for example, to send output to the output pipeline 403, to run a script or to perform sorting. The type of output created differs depending on the type of process used.

In another embodiment execution is design driven. A process template may specify what is needed for an output. The process engine can retrieve blocks and fields as needed (one at a time or as collections of data). The process engine can then place the individual data items or collections of data in the output as determined by the process template. The placement of data may be altered at runtime by script logic and/or rules.

As discussed above, a Paginated Output process produces a page layout for documents for printing, faxing, PDF, web etc.; a Textual Output process produces flat field and record based text files; a Markup Language Output process and produces XML (or other markup language) output; an Electronic Mail Output process produces e-mail and can also attach the result of another process to the e-mail; a Short Message Service process produces SMS messages that can be sent to mobile phones. Other processes can be defined as needed or desired.

In another embodiment, output sent to the output pipeline is sent as meta records containing instructions for the device drivers. An example of a meta record is as follows: output the text ", Inc." at position x=346 and y=345 using font Arial size 10. When fields and variables are used in the output, the process retrieves the current field or variable values from the message instance. This means that a reference to a field or variable is not included in meta records. Instead, the value of the field or variable is sent. To the output pipeline objects, it is transparent if it is static text or text from the incoming data that is being delivered in the meta records. The device drivers 434 convert meta records to device specific output.

The following rules may apply to all output pipelines in the system, according to one embodiment: each physical output object 436 corresponds to one, and only one, queue as defined in the parsing model 324; there may only be one pipeline for each physical output object 436; the physical output object 436 for a pipeline is always the same throughout an entire job; the output pipeline is always connected to one process 426 at a time. These rules imply that output from different processes in the same job, that use the same physical output object 436, will be kept together, that is, delivered as one unit to the final destination, for example a spooler system. According to other embodiments, other rules may apply.

In the embodiment of FIG. 9, data streams can transformed into output data streams in the context of jobs. The default scope of a job is that each input file will result in one job. In thread job execution, one embodiment of thread job manager 404 splits requests into jobs with each job consisting of one or more events together with all processes belonging to these events. The thread job manager 404 is responsible for deciding when a job starts and ends. Therefore, determining the start of a job normally is straight forward since one incoming request to a physical input object will result in one job.

However, the incoming file may be split the incoming file into several smaller jobs. The smallest possible job is when the job consists of only one event. There can be many reasons for dividing a large job into smaller jobs. For example, there may be one entry in the spooler system for each process, for example for each invoice. In a further embodiment some settings may be sent to the output queue. This is usually performed at the beginning of the job, for example downloading overlay files to a printer.

According to one embodiment, each pipeline produces an output entity for the complete job. For example if 30 invoices are received at the input pipeline and a Paginated Output process produces 30 invoices and sends the invoices to a spooler system, these 30 invoices are sent as one print job to the spooler.

The following provides one embodiment a flow of the architecture of FIG. 9 for processing an input stream in the context of a job:

1. When the server starts, the main thread 400 creates the parsing model 324 and all input threads 402 by using information in the files exported from the project tool. When this is done, the main thread becomes idle and listens only to a server shutdown command. If a shutdown command is received, the main thread 400 is responsible for closing all input threads 402.

2. Input data (e.g., from business application 318 of FIG. 8, for example) is received by a physical input object 406.

3. A filter 408 in the input thread 402 ensures that only relevant data is passed to an agent 410.

4. When the agent 410 receives the data, the collect-phase begins. In this phase the agent 410 reads the input file and then carries out the following steps for each event in the job;

4.1. An event 412 is identified and the corresponding data is collected.

4.2. A field list is created for the event.

4.3. Any input scripts defined for the event are run. Once these steps have been carried out for each identified event, sorting (if any) is performed on variables corresponding to the events and the retrieved scripts.

5. The collect phase is now complete.

6. When the thread job manager 404 receives permission from a global thread manager, the first event 412 is created by the thread job manager 404. Information about how to create the event 412 is retrieved from the parsing model 324.

7. The agent 410 fills the event with fields.

8. A message instance 414 is created from the event based on the event's field list and the information in the parsing model 324. A message tree is built using fields, blocks and variables. The message instance 414 is then passed on to the thread job manager 404.

9. Thread job manager 404 sends the message instance 414 to the message broker 418.

10. Thread job manager 404 runs "script before message."

11. Message broker 418 reads message instance 414 as an input message instance.

12. The input message instance may be stored in message store for later retrieval (e.g., for asynchronous message concatenation, re-processing or permanent storage) according to parsing model 324.

13. Message broker 418 transforms the input message instance 414 and/or existing input messages from the message store to generate one or more output message instances 420 based on the parsing model 324 (in particular the message brokering and/or consumer editing models).

14. The thread job manager 404 runs "script before event".

15. The thread job manager 404 creates a process 426 by using information in the parsing model 324 and message instance 420.

16. The thread job manager 404 runs "script before process".

17. A check is made to determine if this process should be skipped. A skip can be forced by a rule attached to the process 426 or by executing a script function "skip ( )" in the "script before process".

18. If no skip is detected, the thread job manager 404 creates the output pipeline 403 for the process 426. This is based on the information in the parsing model 324. The process 426 is then executed according to the instructions in the parsing model 324 and in the data flow. The output pipeline 403 may contain objects, such as sort/archive 432, driver 434, physical output 436. The output pipeline 403 may be operatively connected to a receiving device 204.

19. When the process 426 is finished, "script after process" is executed.

20. Steps 16 to 19 are repeated for all processes 426 defined for the event 412.

21. When all processes 426 are completed the thread job manager 404 runs "script after event".

22. Steps 14 to 21 are performed for each event 412.

The above flow is provided by way of example and not limitation. The steps may be rearranged, substituted, excluded or replaced. Various steps can be repeated as needed or desired.

In the above example, the input pipeline is coupled to output pipeline 403 through message broker 418. According to one embodiment, the input pipelines, message broker processing and output pipeline for a job can be run as a synchronous process. In another embodiment, content ingest can be decoupled from content delivery. Message broker 418 can process messages and generate output message instances outside of the scope a particular input job. For example, scheduled tasks can occur regardless of whether an input data stream is being processed. When a scheduled message alteration task is to occur, a scheduler can initialize a thread and alert a thread job manager of the message alteration task. The thread job manager can invoke the appropriate task at message broker 418 along with the appropriate processes 426 and establish output pipelines 403 for the processes. In this case, message alteration and delivery is decoupled from content ingest. Even without message alteration occurring, message broker 418's message store allows delivery to be decoupled from ingest, thereby allowing the overall message transformation process to run asynchronously.

Figure 10:
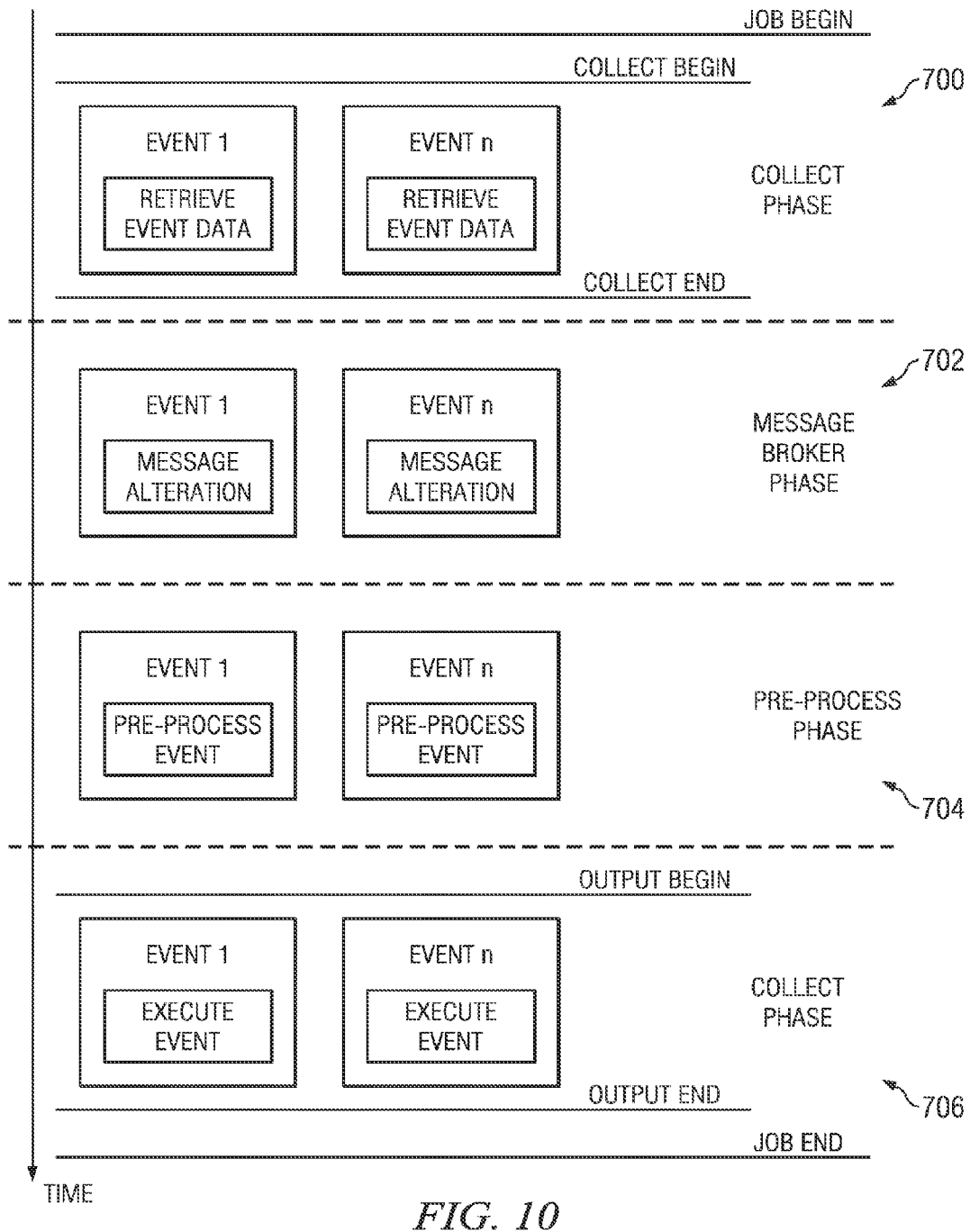
FIG. 10 is a diagrammatic representation of phases in a job.

FIG. 10 illustrates one embodiment of various phases in a job. One example of when a job occurs when an external application that is required to process an output job sends this job as one file to the distribution system. When the agent receives the job and recognizes it as something that should trigger an event, the job begins. This sends signals to the thread job manager for the job to begin and for the collect phase 700 to begin.

The agent will now start to scan the input for fields and new events. All fields found are stored in a list that is associated with the current event. If, in the parsing model, the field is designated to create a variable or tokenized data, this is done at this stage. If a new event is found it will be added to a list of found events, and any fields found after this will be associated with this event. Message instances can be created for each event according to the specified message structure for the identified event. A list of message instances can be created in the collect phase that is used to sort the message instances. Information is stored in the parsing model about whether or not sorting should be carried out.

In message brokering phase 702, the message broker reads one or more input message instances associated with the job and/or from storage and transforms the input message instances to output message instances based on the message brokering model.

The thread job manager will now pre-process all message instances and processes belonging to the job in a pre-process phase 704. During the pre-process phase 704 the whole job is executed, but without sending anything to the output pipeline. The pre-process phase 704 is used, for example, to calculate the number of pages and where page breaks occur and to determine which resources are to be used. A resource may, for example, be an overlay that should be sent to a printer. It is also possible to cancel the job, that is undo everything that has been done in the job and skip the rest of the input. This can be done conditionally, based on input field values, in scripts. According to one embodiment, process execution is carried out in, the pre-process phase 704 in the following order:

1 The first message instance in the list pre-processed first, then all the processes for the corresponding event.

2 The next message instance in the event is pre-processed, together with its processes, is preprocessed.

3 This continues until all the events in the list have been pre-processed.

Note that this is the order after events have been sorted. Before and after each event and process a script is run. In this script, the process can conditionally be skipped.

Now the thread job manager has stored all information needed from the pre-process phase 704 and can execute the events and processes in a process phase 706. According to one embodiment, the thread job manager performs a rollback on everything. For example, variables are restored to their values before the pre-process phase 704 and ODBC operations that have been executed in a transaction are rolled-back. Next the thread job manager sends any resources (for example, overlays) that were found during the pre-process phase 704 to the output pipeline. The events and processes are executed in the process phase 706 in the same order as in the pre-process phase 706. The difference is that this time the output is actually sent to the output pipeline. After the last process is executed, the job is complete. The thread job manager releases all resources that were temporarily assigned.

Figure 11A:
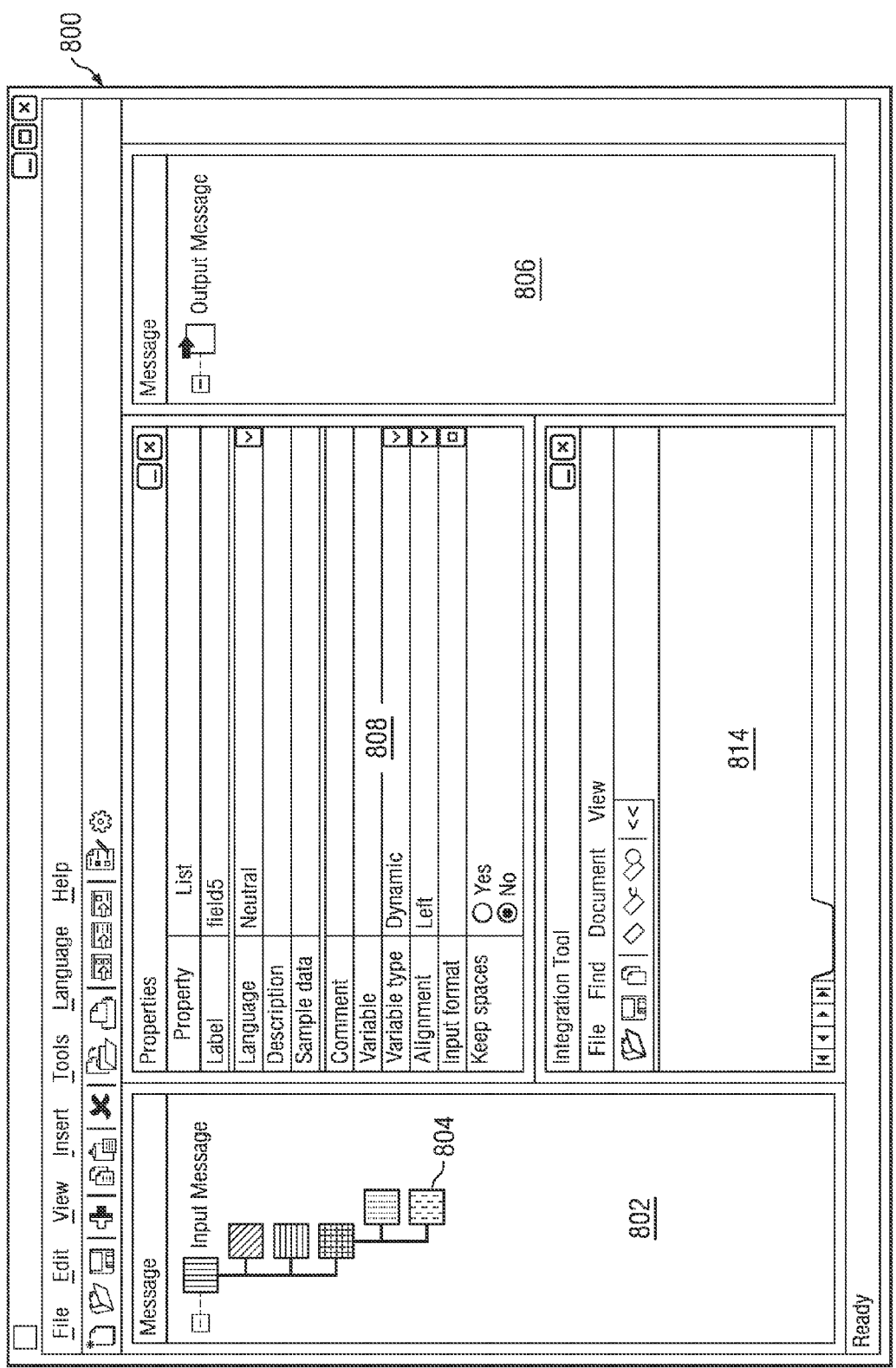
FIG. 11A and FIG. 11B are diagrammatic representations of one embodiment of a graphical user interface.
Figure 11B:
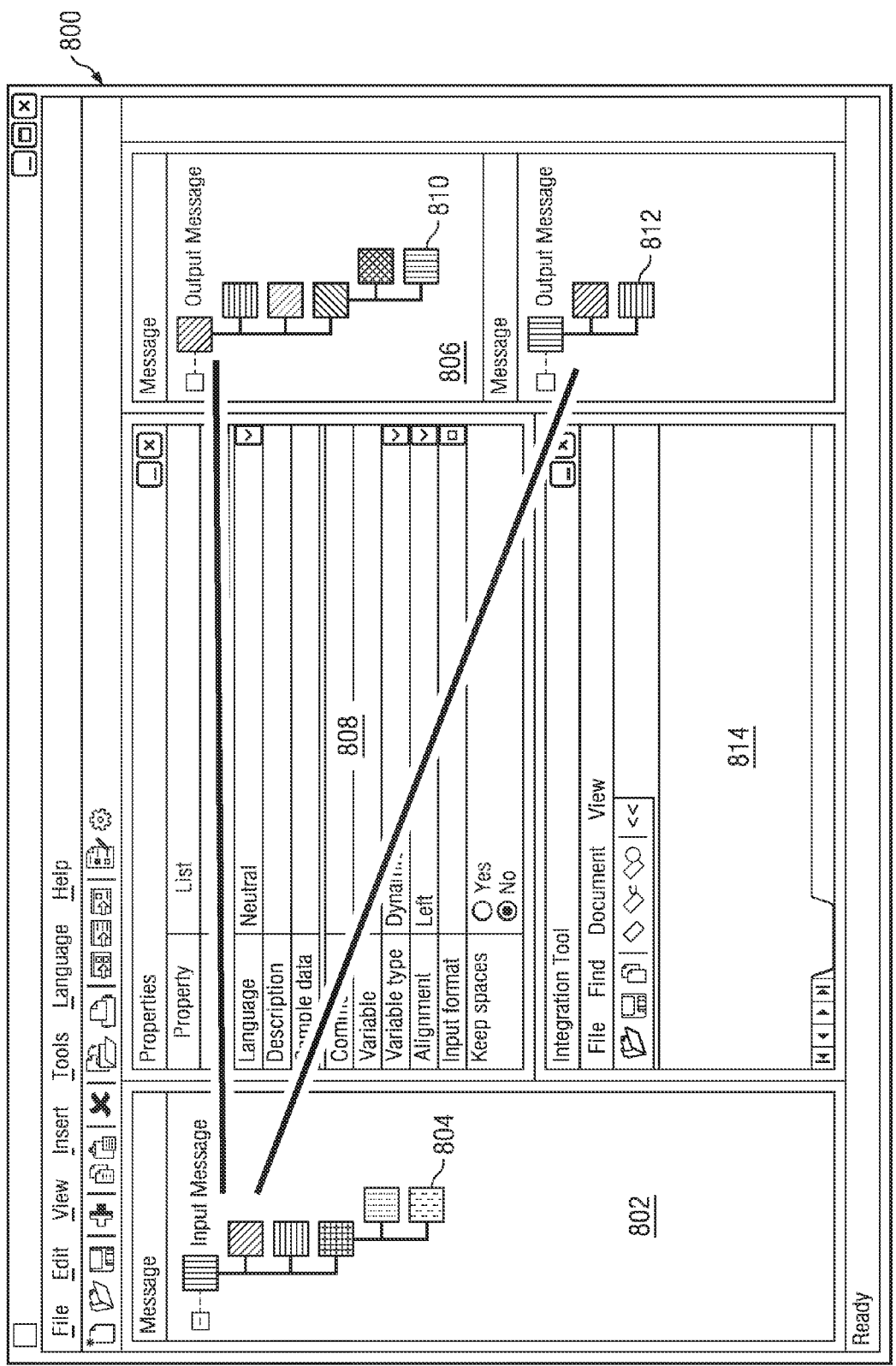

As discussed above, message instances may be stored or altered based on a message broker model. FIGS. 11A and 11B are diagrammatic representations of one embodiment of a graphical user interface 800 for specifying message alteration rules. According to one embodiment, the graphical user interface can include an input message pane 802 which presents the message model (message structure) 804 for an input message for a selected event. Output message pane 806 allows the user to specify a model for an output message. Properties pane 808 displays information regarding selected nodes in the input message model or output message model and allows the user to specify, for example, formatting rules, editing rules, or other rules to apply to a node.

According to one embodiment, the user can define each output message model by dragging and dropping nodes from input message model 804. As shown in FIG. 11B, for example, the user has created two output message models (810 and 812), by dragging and dropping nodes from input message model 804. The user can modify output field and block names and node values by editing properties in properties pane 808. To merge two fields, for example, the user can drag nodes for two input message fields to the same output message fields. The user can further remodel the output message model by dragging and dropping nodes in the output message pane 806. For concatenation of input messages, the models for all the messages the messages to be concatenated can be displayed in input message pane 802. The user can select data from individual messages at a time if desired.

The user interface may also include a runtime data retriever pane 814. In runtime data retriever pane 814, the user can specify external data to collect and any other information needed for the message broker to connect to the external database or application through its API. This provides an area to define the consumer editing model.

In the foregoing, reference was made to specific example embodiments. However, one of ordinary skill in the art appreciates that various modifications and changes can be made without departing from the scope of the embodiments. Accordingly, the example embodiments and figures are to be regarded in an illustrative rather than a restrictive sense, and all such modifications are intended to be included within the scope of embodiment.

Although the invention has been described with respect to specific embodiments thereof, these embodiments are merely illustrative, and not restrictive of the invention. The description herein of illustrated embodiments of the invention, including the description in the Abstract and Summary, is not intended to be exhaustive or to limit the invention to the precise forms disclosed herein (and in particular, the inclusion of any particular embodiment, feature or function within the Abstract or Summary is not intended to limit the scope of the invention to such embodiment, feature or function). Rather, the description is intended to describe illustrative embodiments, features and functions in order to provide a person of ordinary skill in the art context to understand the invention without limiting the invention to any particularly described embodiment, feature or function, including any such embodiment feature or function described in the Abstract or Summary. While specific embodiments of, and examples for, the invention are described herein for illustrative purposes only, various equivalent modifications are possible within the spirit and scope of the invention, as those skilled in the relevant art will recognize and appreciate. As indicated, these modifications may be made to the invention in light of the foregoing description of illustrated embodiments of the invention and are to be included within the spirit and scope of the invention. Thus, while the invention has been described herein with reference to particular embodiments thereof, a latitude of modification, various changes and substitutions are intended in the foregoing disclosures, and it will be appreciated that in some instances some features of embodiments of the invention will be employed without a corresponding use of other features without departing from the scope and spirit of the invention as set forth. Therefore, many modifications may be made to adapt a particular situation or material to the essential scope and spirit of the invention.

Reference throughout this specification to "one embodiment", "an embodiment", or "a specific embodiment" or similar terminology means that a particular feature, structure, or characteristic described in connection with the embodiment is included in at least one embodiment and may not necessarily be present in all embodiments. Thus, respective appearances of the phrases "in one embodiment", "in an embodiment", or "in a specific embodiment" or similar terminology in various places throughout this specification are not necessarily referring to the same embodiment. Furthermore, the particular features, structures, or characteristics of any particular embodiment may be combined in any suitable manner with one or more other embodiments. It is to be understood that other variations and modifications of the embodiments described and illustrated herein are possible in light of the teachings herein and are to be considered as part of the spirit and scope of the invention.

In the description herein, numerous specific details are provided, such as examples of components and/or methods, to provide a thorough understanding of embodiments of the invention. One skilled in the relevant art will recognize, however, that an embodiment may be able to be practiced without one or more of the specific details, or with other apparatus, systems, assemblies, methods, components, materials, parts, and/or the like. In other instances, well-known structures, components, systems, materials, or operations are not specifically shown or described in detail to avoid obscuring aspects of embodiments of the invention. While the invention may be illustrated by using a particular embodiment, this is not and does not limit the invention to any particular embodiment and a person of ordinary skill in the art will recognize that additional embodiments are readily understandable and are a part of this invention.

Embodiments discussed herein can be implemented in a computer communicatively coupled to a network (for example, the Internet), another computer, or in a standalone computer. As is known to those skilled in the art, the computer can include a central processing unit ("CPU"), at least one read-only memory ("ROM"), at least one random access memory ("RAM"), at least one hard drive ("HD"), and one or more input/output ("I/O") device(s). The I/O devices can include a keyboard, monitor, printer, electronic pointing device (for example, mouse, trackball, stylus, etc.), or the like. In embodiments of the invention, the computer has access to at least one database over the network.

Any suitable programming language can be used to implement the routines, methods or programs of embodiments of the invention described herein, including C, C++, Java, JavaScript, HTML, or any other programming or scripting code, etc. Other software/hardware/network architectures may be used. For example, the functions of the disclosed embodiments may be implemented on one computer or shared/distributed among two or more computers in or across a network. Communications between computers implementing embodiments can be accomplished using any electronic, optical, radio frequency signals, or other suitable methods and tools of communication in compliance with known network protocols.

Different programming techniques can be employed such as procedural or object oriented. Any particular routine can execute on a single computer processing device or multiple computer processing devices, a single computer processor or multiple computer processors. Data may be stored in a single storage medium or distributed through multiple storage mediums, and may reside in a single database or multiple databases (or other data storage techniques). Although the steps, operations, or computations may be presented in a specific order, this order may be changed in different embodiments. In some embodiments, to the extent multiple steps are shown as sequential in this specification, some combination of such steps in alternative embodiments may be performed at the same time. The sequence of operations described herein can be interrupted, suspended, or otherwise controlled by another process, such as an operating system, kernel, etc. The routines can operate in an operating system environment or as stand-alone routines. Functions, routines, methods, steps and operations described herein can be performed in hardware, software, firmware or any combination thereof.

Embodiments described herein can be implemented in the form of control logic in software or hardware or a combination of both. The control logic may be stored in an information storage medium, such as a computer-readable medium, as a plurality of instructions adapted to direct an information processing device to perform a set of steps disclosed in the various embodiments. Based on the disclosure and teachings provided herein, a person of ordinary skill in the art will appreciate other ways and/or methods to implement the invention.

It is also within the spirit and scope of the invention to implement in software programming or code an of the steps, operations, methods, routines or portions thereof described herein, where such software programming or code can be stored in a computer-readable medium and can be operated on by a processor to permit a computer to perform any of the steps, operations, methods, routines or portions thereof described herein. The invention may be implemented by using software programming or code in one or more general purpose digital computers, by using application specific integrated circuits, programmable logic devices, field programmable gate arrays, optical, chemical, biological, quantum or nanoengineered systems, components and mechanisms may be used. In general, the functions of the invention can be achieved by any means as is known in the art. For example, distributed, or networked systems, components and circuits can be used. In another example, communication or transfer (or otherwise moving from one place to another) of data may be wired, wireless, or by any other means.

A "computer-readable medium" may be any medium that can contain, store, communicate, propagate, or transport the program for use by or in connection with the instruction execution system, apparatus, system or device. The computer readable medium can be, by way of example only but not by limitation, an electronic, magnetic, optical, electromagnetic, infrared, or semiconductor system, apparatus, system, device, propagation medium, or computer memory. Such computer-readable medium shall generally be machine readable and include software programming or code that can be human readable (e.g., source code) or machine readable (e.g., object code). Examples of non-transitory computer-readable media can include random access memories, read-only memories, hard drives, data cartridges, magnetic tapes, floppy diskettes, flash memory drives, optical data storage devices, compact-disc read-only memories, and other appropriate computer memories and data storage devices. In an illustrative embodiment, some or all of the software components may reside on a single server computer or on any combination of separate server computers. As one skilled in the art can appreciate, a computer program product implementing an embodiment disclosed herein may comprise one or more non-transitory computer readable media storing computer instructions translatable by one or more processors in a computing environment.

A "processor" includes any, hardware system, mechanism or component that processes data, signals or other information. A processor can include a system with a general-purpose central processing unit, multiple processing units, dedicated circuitry for achieving functionality, or other systems. Processing need not be limited to a geographic location, or have temporal limitations. For example, a processor can perform its functions in "real-time," "offline," in a "batch mode," etc. Portions of processing can be performed at different times and at different locations, by different (or the same) processing systems.

It will also be appreciated that one or more of the elements depicted in the drawings/figures can also be implemented in a more separated or integrated manner, or even removed or rendered as inoperable in certain cases, as is useful in accordance with a particular application. Additionally, any signal arrows in the drawings/figures should be considered only as exemplary, and not limiting, unless otherwise specifically noted.

As used herein, the terms "comprises," "comprising," "includes," "including," "has," "having," or any other variation thereof, are intended to cover a non-exclusive inclusion. For example, a process, product, article, or apparatus that comprises a list of elements is not necessarily limited only those elements but may include other elements not expressly listed or inherent to such process, product, article, or apparatus.

Furthermore, the term "or" as used herein is generally intended to mean "and/or" unless otherwise indicated. For example, a condition A or B is satisfied by any one of the following: A is true (or present) and B is false (or not present), A is false (or not present) and B is true (or present), and both A and B are true (or present). As used herein, including the claims that follow, a term preceded by "a" or "an" (and "the" when antecedent basis is "a" or "an") includes both singular and plural of such term, unless clearly indicated within the claim otherwise (i.e., that the reference "a" or "an" clearly indicates only the singular or only the plural). Also, as used in the description herein and throughout the claims that follow, the meaning of "in" includes "in" and "on" unless the context clearly dictates otherwise. The scope of the present disclosure should be determined by the following claims and their legal equivalents.

What is claimed is:

1. A system of altering message instances comprising:
   an input port;
   an output port;
   a memory;
   a processor; and
   a non-transitory computer readable medium storing a set of computer instructions executable by the processor to provide:
   an input connector to receive input data streams through the input port;
   an output connector to provide an output data stream through the output port;
   an event agent configured to identify events in the input data streams and generate input message instances containing data corresponding to the events from the input data streams;
   a thread job manager configured to receive input message instances from the event agent and pass the input message instances to a message broker,
   the message broker, configured to:
      access the message broker model,
      receive input message instances,
      store the input message instances in a message store, and
      generate output message instances according to the message broker model by performing a message alteration task on the input message instances to generate a corresponding output message instance, the message alteration task comprising editing content data from at least one of the input message instances, mapping content data of a first message instance having a first input message structure to an output message structure for the corresponding output message instance; and a process engine configured to execute a process on the output message instances to generate the output data stream based on the output message structure.

2. The system of claim 1, further comprising input pipelines for content ingest and output pipelines for content delivery.

3. The system of claim 1, wherein the message broker is further configured to concatenate content data from the input message instances created from a first input data stream and a second input data stream with external data to generate an output message instance.

4. The system of claim 1, wherein the input message instances have a first tree structure comprising blocks and fields and the output message instances have a second tree structure different than the first tree structure.

5. The system of claim 1, wherein the message broker is further configured to generate the output message instances in the context of a job wherein a first data input stream was received prior to initiation of the job.

6. The system of claim 1, further comprising a user interface to allow a user to define the message brokering model.

7. The system of claim 6, wherein the user interface allows a user to select portions of the first input message structure and portions of a second input message structure to combine into a third message structure.

8. The system of claim 1, further comprising a scheduler configured to start a new thread to invoke the message alteration task.

9. The system of claim 1, wherein the thread job manager includes a first input thread to manage processing of a first input data stream and a second input thread to manage processing a second input data stream.

10. The system of claim 9, wherein the message broker performs the alteration task in a context of a third thread.

11. A method for transforming an input data stream in a first data format to an output data stream of a second format, the method comprising:
providing a message brokering model;
receiving a first input data stream;
receiving a second input data stream;
in a first thread:
identifying events in the first input data stream and generating a first message instance comprising data corresponding to the events from the first input data stream;
providing the first set of message instances to a message broker;
identifying events in the second input data stream and generating a second set of message instances comprising data corresponding to the events from the second input data stream;
providing the second message instance to the message broker;
performing, by the message broker, a message alteration on the first set of message instances and the second message instance to generate an output message instance according to the message brokering model by editing content of at least one message instance, mapping content from at least one input message instance from a first input message structure associated with a first type of event to an output message structure for the output message instance; and
generating the output data stream using the output message instance.

12. The method of claim 11, wherein the message broker is executing in a second thread initiated based on a trigger.

13. The method of claim 11, further comprising:
generating the output data stream through stream processing in a second thread running asynchronously to the first thread.

14. The method of claim 11, performing the message alteration further comprises concatenating the at least one input message instance with external data to generate the output message instance.

15. The method of claim 11, wherein the first set of input message instances have a first tree structure comprising blocks and fields and the output message instances have a second tree structure different than the first tree structure.

16. The method of claim 11, further comprising generating, in a context of a job, the output message instances, wherein the second input data stream is received prior to the first input data stream.

17. A non-transitory computer readable medium, comprising instructions for transforming an input data stream in a first data format to an output data stream of a second format, including instructions for:
providing a message brokering model;
receiving a first input data stream;
receiving a second input data stream;
in a first thread:
identifying events in the first input data stream and generating a first set of message instances comprising data corresponding to the events from the first input data stream;
providing the first set of message instances to a message broker;
identifying events in the second input data stream and generating a second set of message instances comprising data corresponding to the events from the second input data stream;
providing the second message instance to the message broker;
performing, by the message broker, a message alteration on the first set of message instances and the second message instance to generate an output message instance according to the message brokering model by editing content of at least one message instance, mapping content from at least one input message instance from a first input message structure associated with a first type of event to an output message structure for the output message instance; and
generating the output data stream using the output message instance.

18. The computer readable medium of claim 17, wherein the message broker is execute in a second thread initiated based on a trigger.

19. The computer readable medium of claim 17, further comprising:
generating the output data stream through stream processing in a second thread running asynchronously to the first thread.

20. The computer readable medium of claim 17, performing the message alteration further comprises concatenating the at least one input message instance with external data to generate an output message instance.

21. The computer readable medium of claim 17, wherein the first set of input message instances have a first tree structure comprising blocks and fields and the output message instances have a second tree structure different than the first tree structure.

\* \* \* \* \*